United States Patent
Adachi

(10) Patent No.: US 11,402,698 B2
(45) Date of Patent: Aug. 2, 2022

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/205,019

(22) Filed: Mar. 18, 2021

(65) Prior Publication Data

US 2021/0302775 A1    Sep. 30, 2021

(30) Foreign Application Priority Data

Mar. 26, 2020    (JP) .............................. JP2020-056414

(51) Int. Cl.
*G02F 1/1339*    (2006.01)
*G02F 1/1335*    (2006.01)
*G02F 1/1362*    (2006.01)

(52) U.S. Cl.
CPC .... *G02F 1/13394* (2013.01); *G02F 1/133512* (2013.01); *G02F 1/136286* (2013.01)

(58) Field of Classification Search
None
See application file for complete search history.

(56) References Cited

U.S. PATENT DOCUMENTS

| | | | |
|---|---|---|---|
| 2008/0198317 A1* | 8/2008 | Tseng | G02F 1/13394 349/138 |
| 2016/0085105 A1* | 3/2016 | Jeon | G02F 1/133512 349/110 |
| 2019/0196242 A1 | 6/2019 | Nomura et al. | |
| 2021/0165254 A1* | 6/2021 | Nagasawa | G02F 1/136286 |

FOREIGN PATENT DOCUMENTS

JP    2019-117221 A    7/2019

* cited by examiner

*Primary Examiner* — Thanh Nhan P Nguyen
(74) *Attorney, Agent, or Firm* — Oblon, McClelland, Maier & Neustadt, L.L.P.

(57) ABSTRACT

According to one embodiment, a display device includes first to third scanning lines, first and a second protrusion portions disposed on the second scanning line and arranged in a first direction, third and seventh protrusion portions disposed on a side close to the third scanning line on the second scanning line, fourth and sixth protrusion portions disposed on a side close to the first scanning line on the second scanning line, and a fifth protrusion portion disposed between the first protrusion portion and the second protrusion portion. The third and sixth protrusion portions are arranged in the second direction, and the fourth and seventh protrusion portions are arranged in the second direction.

17 Claims, 19 Drawing Sheets

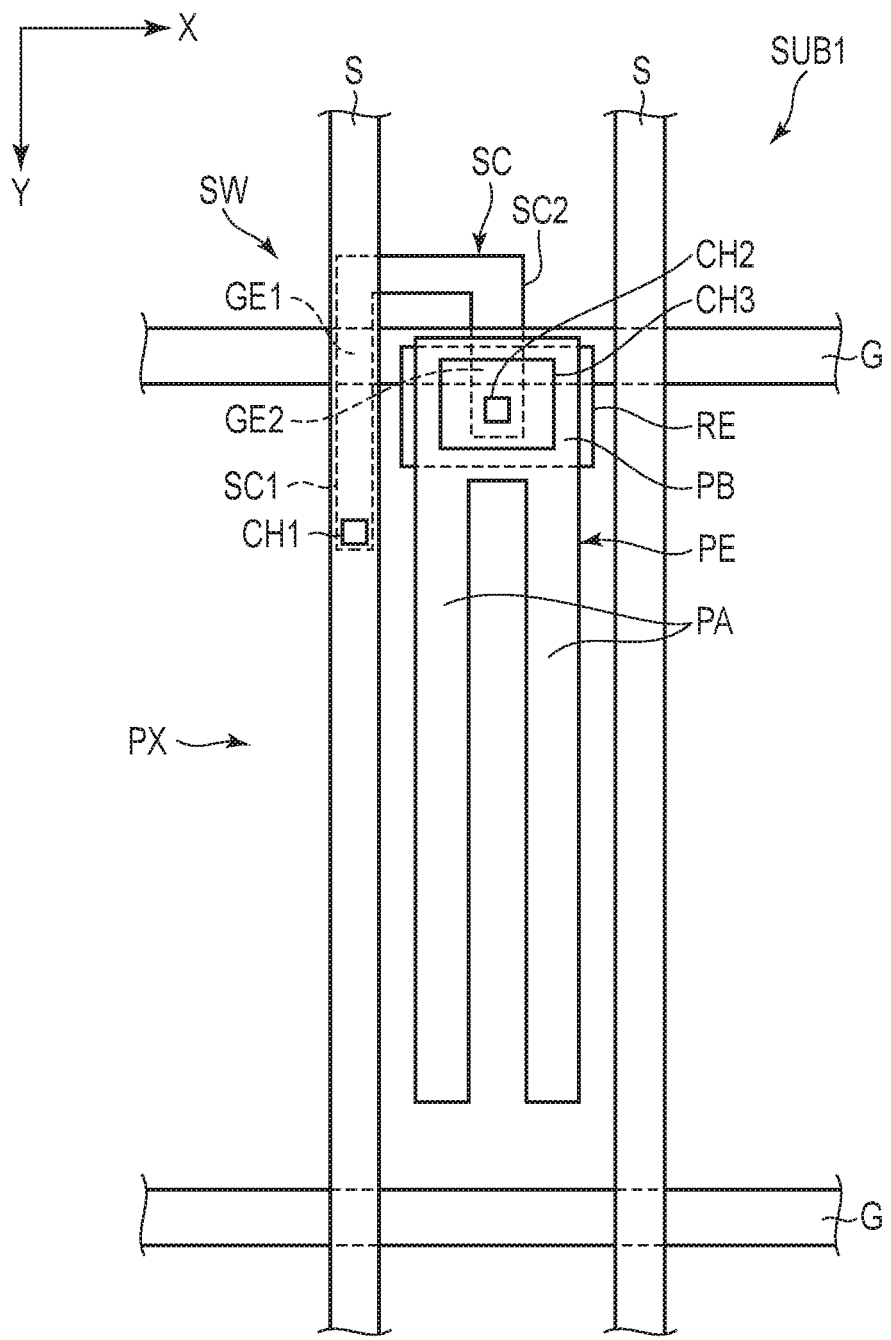
F I G. 2

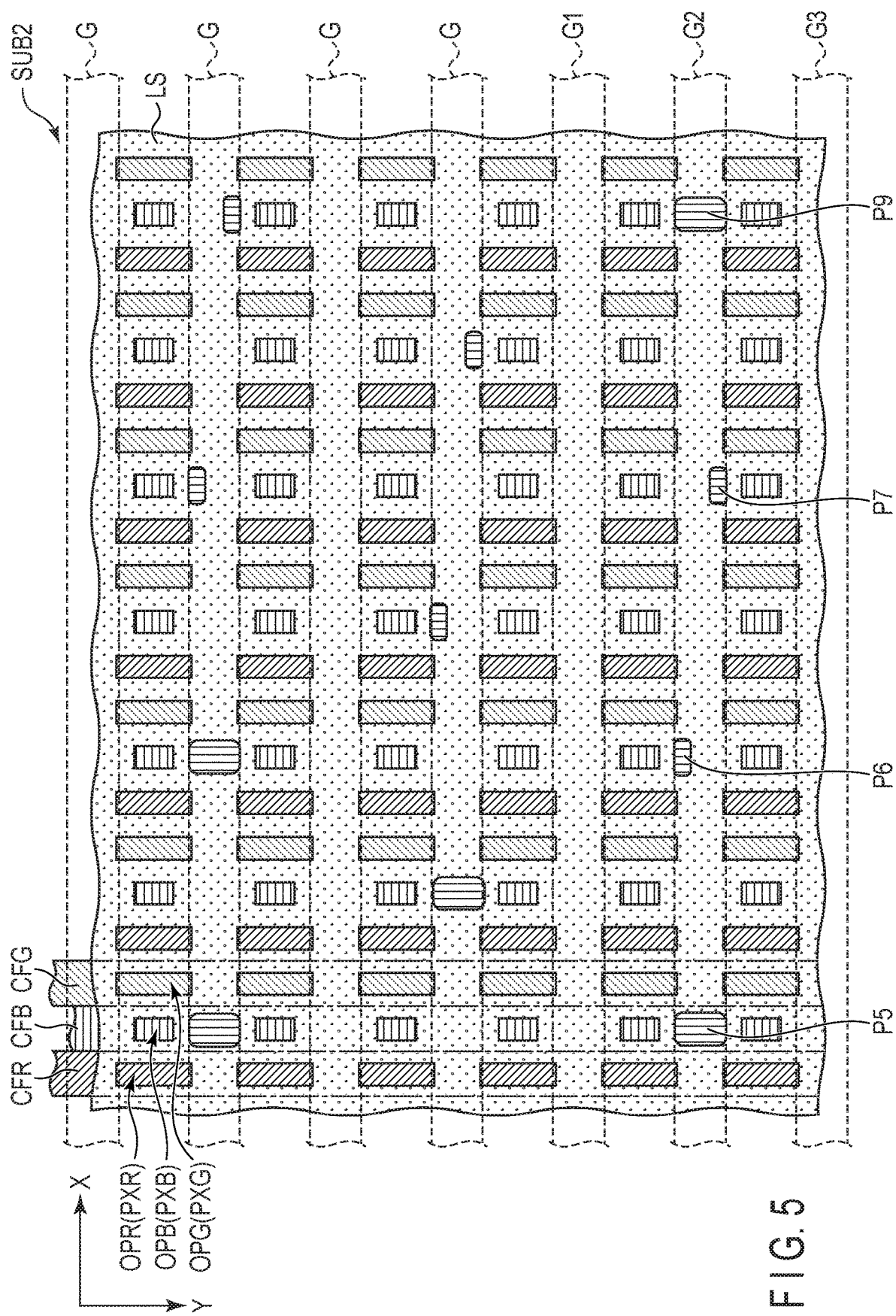
F I G. 5

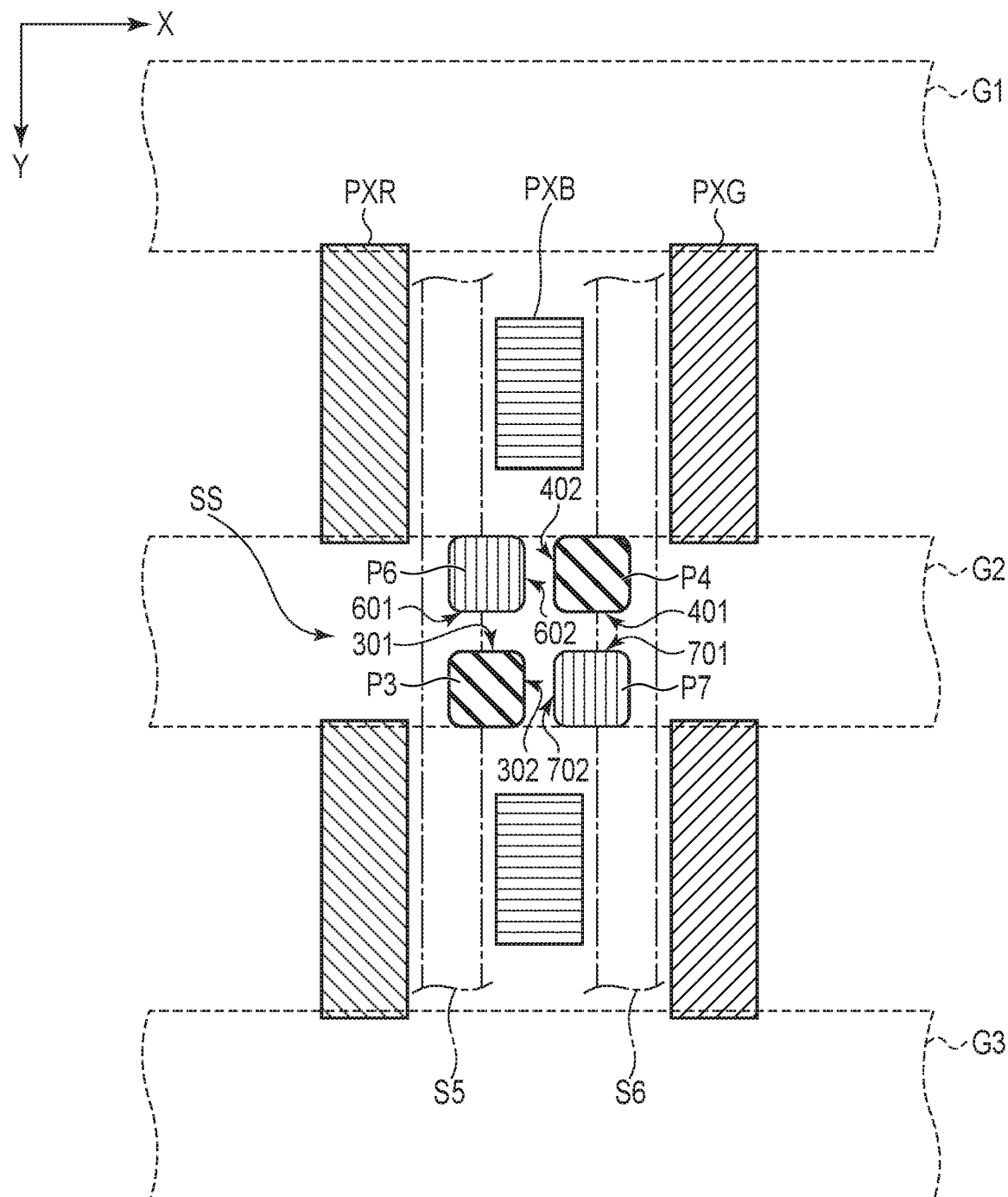
F I G. 16

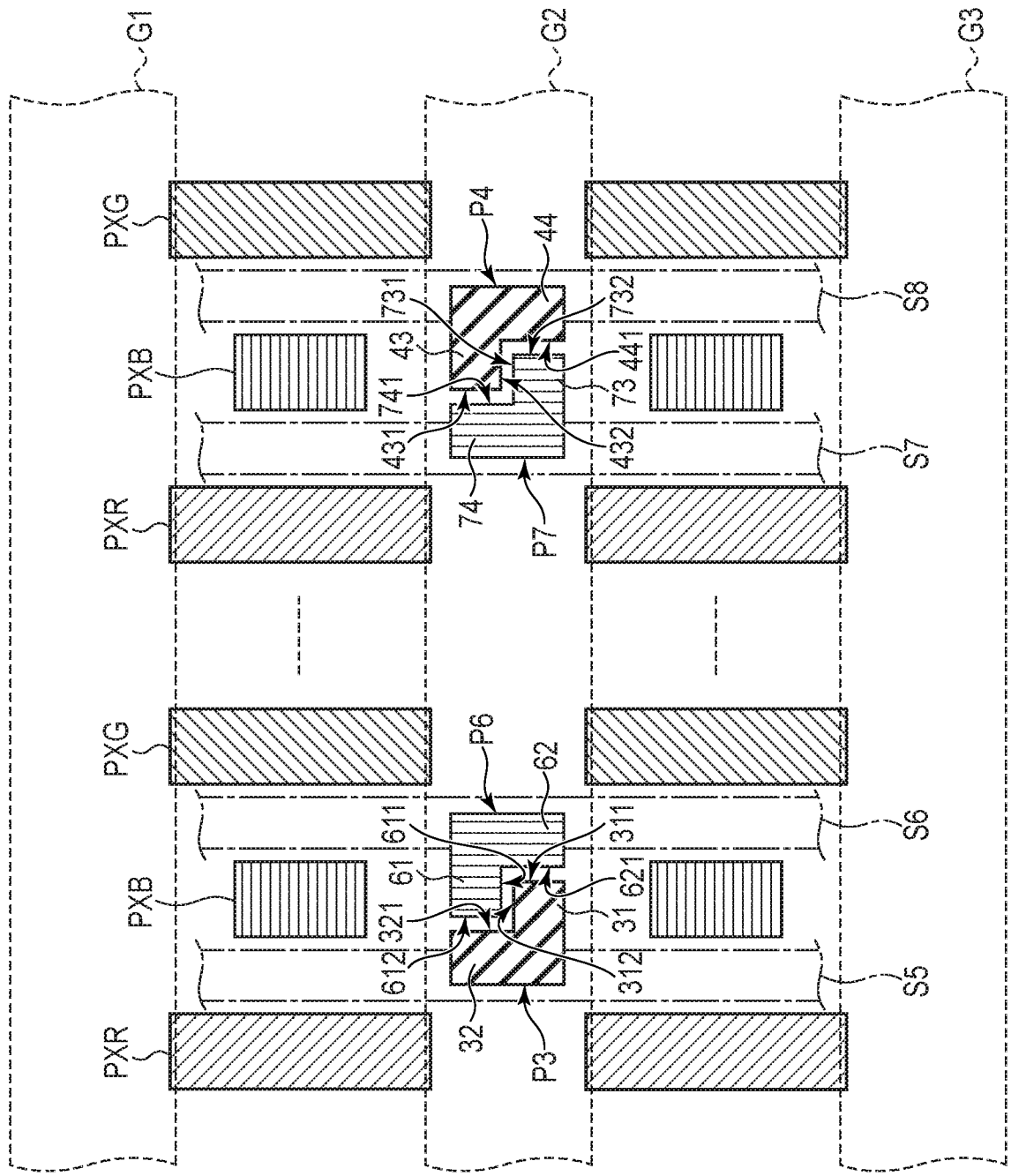
F I G. 18

DISPLAY DEVICE

CROSS-REFERENCE TO RELATED APPLICATIONS

This application is based upon and claims the benefit of priority from Japanese Patent Application No. 2020-056414, filed Mar. 26, 2020, the entire contents of which are incorporated herein by reference.

FIELD

Embodiments described herein relate generally to a display device.

BACKGROUND

Recently, various liquid crystal display devices each comprising a liquid crystal layer between a first substrate comprising a first spacer and a second substrate comprising a second spacer have been proposed. In this liquid crystal display device, in a main spacer, the first spacer and the second spacer are in contact with each other and form a cell gap. In a sub-spacer, normally, in a state where a display surface is not pressed, the first spacer and the second spacer are apart from each other. In this sub-spacer, if the second substrate is relatively displaced along a first direction with respect to the first substrate, a side surface of the first spacer and a side surface of the second spacer contact each other, and an excessive displacement is suppressed.

However, if a force causing a displacement along a second direction orthogonal to the first direction is applied, there is no structure which suppresses this displacement. Therefore, when the first spacer and the second spacer contact alignment films, respectively, the alignment films may be damaged in association with the displacement. If the alignment films are damaged, the alignment of liquid crystal molecules is lost, and this may cause light leakage. Although light leakage can be suppressed by disposing a light-shielding layer over a wide range, this causes a decrease of an area (opening area) contributing to display of each pixel, a decrease of transmittance, deterioration of color balance, and the like.

BRIEF DESCRIPTION OF THE DRAWINGS

FIG. 2 is a plan view showing a configuration example of a pixel PX shown in FIG. 1.

FIG. 5 is a plan view showing a second substrate SUB2 corresponding to the pixel layout shown in FIG. 3.

FIG. 16 is an enlarged plan view of a modification example of a sub-spacer SS.

FIG. 18 is an enlarged plan view of another modification example of the sub-spacer SS.

DETAILED DESCRIPTION

Figure 1:
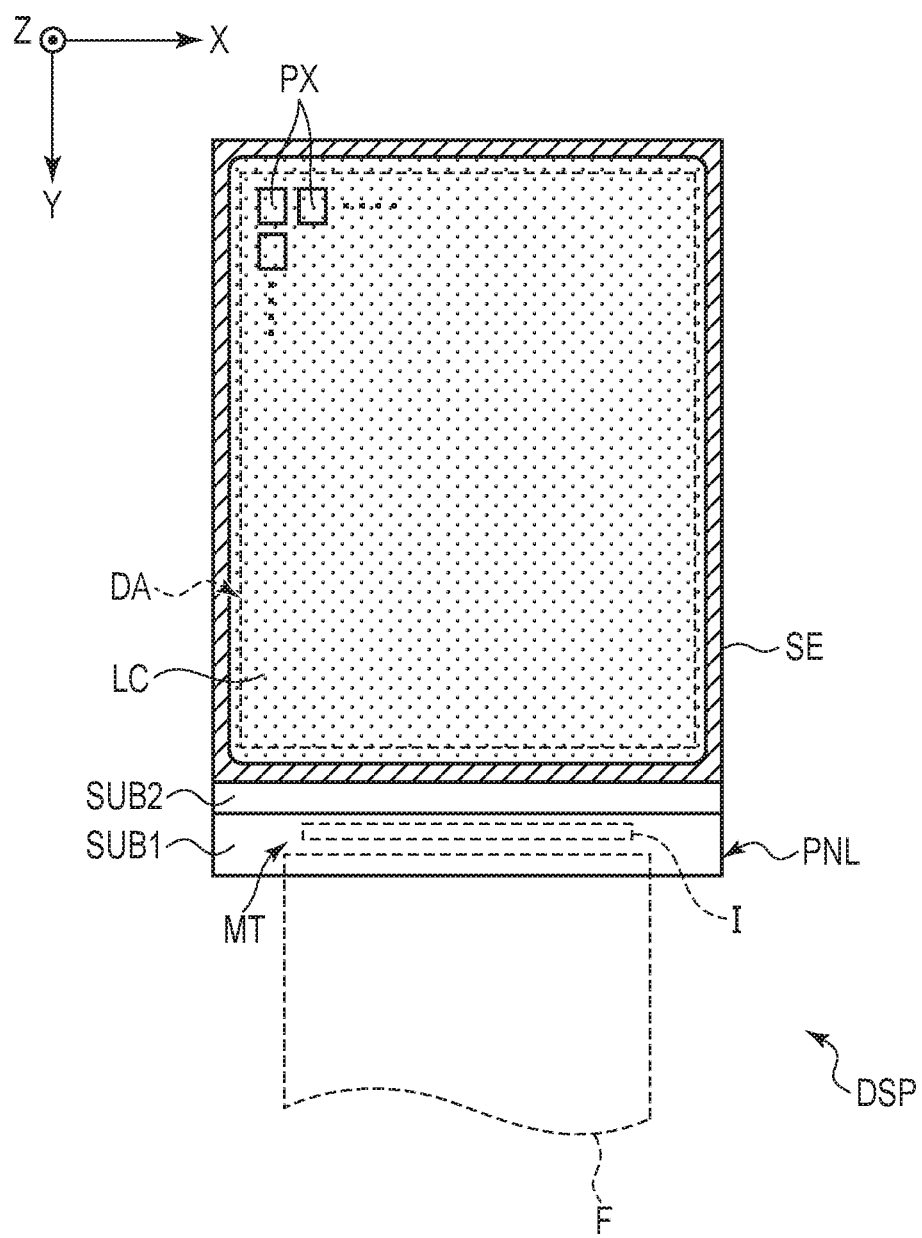
FIG. 1 is a plan view showing a configuration example of a display device DSP of the present embodiment.

In general, according to one embodiment, there is provided a display device comprising a first substrate, a second substrate and a liquid crystal layer. The first substrate comprises first to third scanning lines extending in a first direction and arranged in order in a second direction, a plurality of signal lines extending in the second direction, a first protrusion portion and a second protrusion portion disposed on the second scanning line and arranged in the first direction, a third protrusion portion disposed on a side close to the third scanning line on the second scanning line, and a fourth protrusion portion disposed on a side close to the first scanning line on the second scanning line. The second substrate comprises a fifth protrusion portion disposed between the first protrusion portion and the second protrusion portion, a sixth protrusion portion disposed on a side close to the first scanning line on the second scanning line, and a seventh protrusion portion disposed on a side close to the third scanning line on the second scanning line in planar view. The liquid crystal layer is held between the first substrate and the second substrate. The first to fourth protrusion portions are apart from the second substrate. The fifth to seventh protrusion portions are apart from the first substrate. The third protrusion portion and the sixth protrusion portion are arranged in the second direction. The fourth protrusion portion and the seventh protrusion portion are arranged in the second direction.

According to another embodiment, there is provided a display device comprising a first substrate, a second substrate and a liquid crystal layer. The first substrate comprises a scanning line extending in a first direction, a signal line extending in a second direction, and first to fourth protrusion portions. The second substrate comprises fifth to seventh protrusion portions. The liquid crystal layer is held between the first substrate and the second substrate. The first to fourth protrusion portions are apart from the second substrate. The fifth to seventh protrusion portions are apart from the first substrate. In planar view, the first protrusion portion and the second protrusion portion are arranged in the first direction, the fifth protrusion portion is disposed between the first protrusion portion and the second protrusion portion, the third protrusion portion and the sixth protrusion portion are arranged in the second direction, the fourth protrusion portion and the seventh protrusion portion are arranged in the second direction, the third protrusion portion and the seventh protrusion portion are arranged in the first direction, and the fourth protrusion portion and the sixth protrusion portion are arranged in the first direction.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference symbols, and detailed explanations of them that are considered redundant may be omitted unless necessary.

FIG. 1 is a plan view showing a configuration example of a display device DSP of the present embodiment. In one example, a first direction X, a second direction Y and a third direction Z are orthogonal to one another. However, they may cross one another at an angle other than 90 degrees. The first direction X and the second direction Y correspond to directions parallel to the main surface of a substrate constituting the display device DSP, and the third direction Z corresponds to the thickness direction of the display device DSP. In the present embodiment, viewing an XY-plane defined by the first direction X and the second direction Y is referred to as planar view.

The display device DSP comprises a display panel PNL. The display panel PNL is, for example, a liquid crystal panel, and comprises a first substrate SUB1, a second substrate SUB2, and a liquid crystal layer LC as a display function layer. The first substrate SUB1 and the second substrate SUB2 are opposed to each other in the third direction Z, and are bonded together by a sealant SE. The liquid crystal layer LC is held between the first substrate SUB1 and the second substrate SUB2 and is sealed in by the sealant SE.

The display panel PNL comprises a plurality of pixels PX in a display region DA which displays an image. The pixels PX are arranged in a matrix in the first direction X and the second direction Y. The pixel PX here indicates a minimum unit which can be individually controlled according to a pixel signal, and may be referred to also as a sub-pixel.

The first substrate SUB1 comprises a mounting portion MT extending more outward than the second substrate SUB2. A flexible printed circuit board F and an IC chip I indicated by dotted lines are mounted on the mounting portion MT. In some cases, the IC chip I may be mounted on the flexible printed circuit board F.

The display panel PNL may be any of a panel comprising an organic electroluminescent element, a micro-light-emitting diode (LED), a mini-LED or the like, a panel comprising an electrophoretic element, a panel employing microelectromechanical systems (MEMS), a panel employing electrochromism, and the like.

FIG. 2 is a plan view showing a configuration example of the pixel PX shown in FIG. 1. FIG. 2 shows the first substrate SUB1 employing a fringe field switching (FFS) mode which is one of display modes using a lateral electric field. Although the first substrate SUB1 comprises a common electrode, the illustration of the common electrode is omitted here.

The first substrate SUB1 comprises a plurality of scanning lines G, a plurality of signal lines S, a switching element SW electrically connected to the scanning line G and the signal line S, and a pixel electrode PE electrically connected to the switching element SW. The scanning lines G extend in the first direction X and are arranged spaced apart from each other in the second direction Y. The signal lines S extend in the second direction Y and are arranged spaced apart from each other in the first direction X. The pixel PX corresponds to a region surrounded by two adjacent scanning lines G and two adjacent signal lines S.

The switching element SW is a double-gate thin-film transistor in one example. The switching element SW comprises a semiconductor layer SG, gate electrodes GE1 and GE2, and a relay electrode RE. A portion SC1 of the semiconductor layer SC is located directly under the signal line S, and crosses the scanning line G. The portion SC1 is electrically connected to the signal line S in a contact hole CH1. A part of the signal line S which is connected to the semiconductor layer SC functions as, for example, a source electrode of the switching element SW. A portion SC2 of the semiconductor layer SC crosses the scanning line G, and is electrically connected to the relay electrode RE in a contact hole CH2. The relay electrode RE functions as, for example, a drain electrode of the switching element SW. A region of the scanning line G which overlaps the portion SC1 functions as a gate electrode GE1, and a part of the scanning line G which overlaps the portion SC2 functions as a gate electrode GE2.

The pixel electrode PE comprises an electrode portion PA and a contact portion PB. The electrode portion PA and the contact portion PB are integrally formed with each other. The electrode portion PA is formed in a strip shape having a substantially constant width, and extends in the second direction Y. Note that the number of electrode portions PA may be one or greater than or equal to three. In addition, the electrode portion PA may extend in a direction crossing the first direction X and the second direction Y and may be partially bent. The pixel electrode PE is electrically connected to the relay electrode RE in a contact hole CH3. Accordingly, the switching element SW and the pixel electrode PE are electrically connected to each other.

Figure 3:
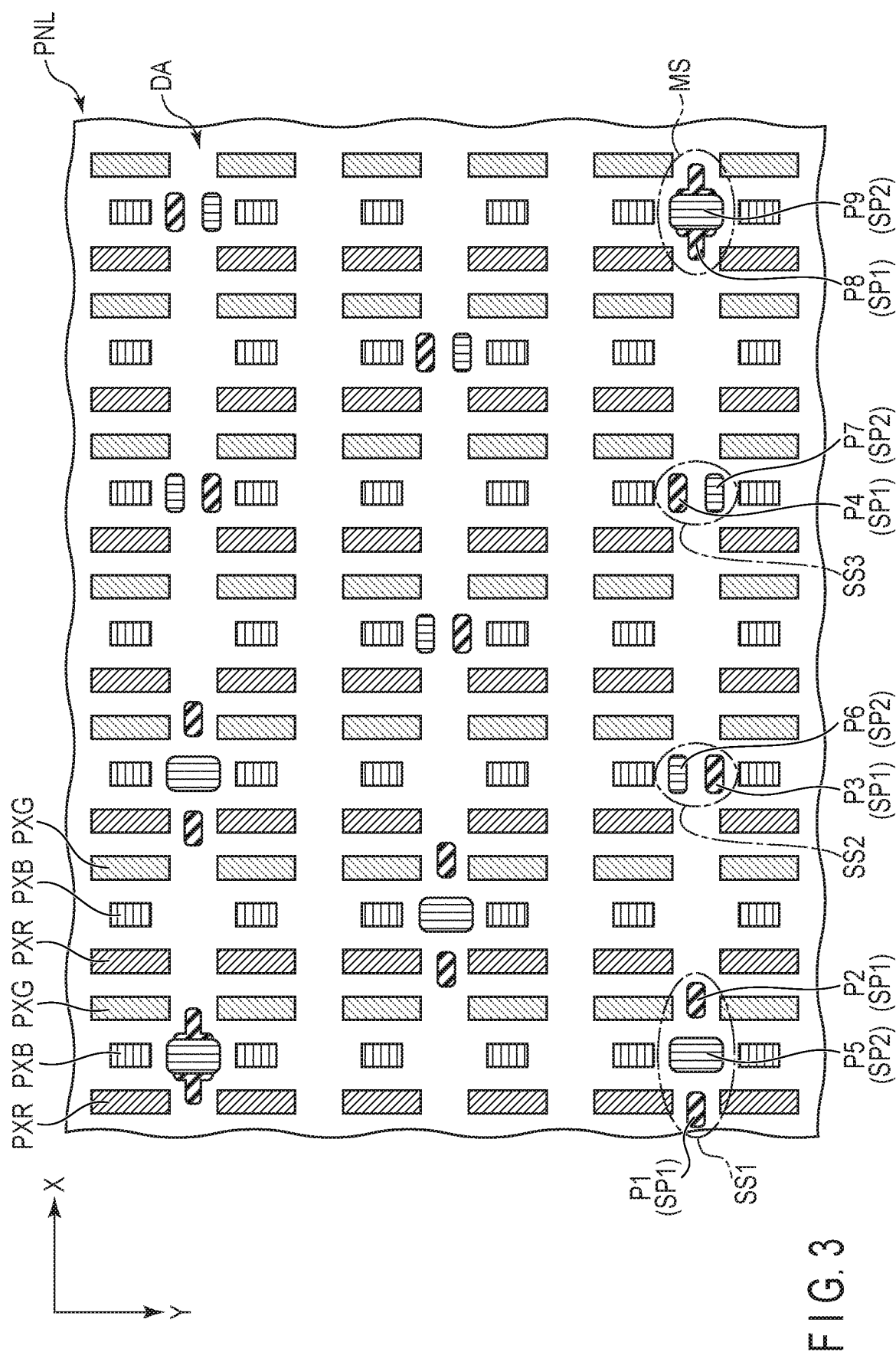
FIG. 3 is an illustration showing an example of a pixel layout in a display region DA shown in FIG. 1.

FIG. 3 is an illustration showing an example of a pixel layout in the display region DA shown in FIG. 1. The display panel PNL comprises, as the pixel PX, a red pixel PXR which displays red, a blue pixel PXB which displays blue, and a green pixel PXG which displays green. The red pixel PXR comprises a red color filter, and is indicated by downward-sloping diagonal lines in the drawing. The blue pixel PXB comprises a blue color filter, and is indicated by horizontal lines in the drawing. The green pixel PXG comprises a green color filter, and is indicated by upward-sloping diagonal lines in the drawing. The red pixel PXR, the blue pixel PXB and the green pixel PXG are arranged in this order in the first direction X. In the example shown in FIG. 3, the pixels PX of the same color are arranged in the second direction Y. However, the pixels PX of different colors may be arranged in the second direction Y.

In addition, the display panel PNL comprises a first sub-spacer SS1, a second sub-spacer SS2, a third sub-spacer SS3 and a main spacer MS. All the first to third sub-spacers SS1 to SS3 and the main spacer MS are disposed close to the blue pixel PXB in one example. As will be described later, the first to third sub-spacers SS1 to SS3 and the main spacer MS are composed of a first spacer SP1 disposed in the first substrate SUB1 and a second spacer SP2 disposed in the second substrate SUB2.

In the specification, the sub-spacer SS is composed such that the first spacer SP1 is apart from the second substrate SUB2 and the second spacer SP2 is apart from the first substrate SUB1 in a steady state where no external force is applied to the display panel PNL, and the first spacer SP1 and the second spacer SP2 contact each other when an external force is applied. The main spacer MS is composed such that the first spacer SP1 and the second spacer SP2 are in contact with each other in the steady state, and forms a predetermined cell gap for forming the liquid crystal layer LC between the first substrate SUB1 and the second substrate SUB2.

The first spacer SP1 includes a first protrusion portion P1, a second protrusion portion P2, a third protrusion portion P3, a fourth protrusion portion P4 and an eighth protrusion portion P8. The second spacer SP2 includes a fifth protrusion portion P5, a sixth protrusion portion P6, a seventh protrusion portion P7 and a ninth protrusion portion P9. The first to fourth protrusion portions P1 to P4 and the fifth to seventh protrusion portions P5 to P7 do not overlap in planar view.

The first sub-spacer SS1 is composed of the first protrusion portion P1, the second protrusion portion P2 and the fifth protrusion portion P5 arranged in the first direction X. The fifth protrusion portion P5 is disposed between the first protrusion portion P1 and the second protrusion portion P2.

The second sub-spacer SS2 is composed of the third protrusion portion P3 and the sixth protrusion portion P6 arranged in the second direction Y.

The third sub-spacer SS3 is composed of the fourth protrusion portion P4 and the seventh protrusion portion P7 arranged in the second direction Y. The third protrusion portion P3 and the seventh protrusion portion P7 are arranged in the first direction X. In addition, the fourth protrusion portion P4 and the sixth protrusion portion P6 are arranged in the first direction X.

The main spacer MS is composed of the eighth protrusion portion P8 and the ninth protrusion portion P9. The ninth protrusion portion P9 overlaps the eighth protrusion portion P8 in planar view.

The first sub-spacer SS1, the second sub-spacer SS2, the third sub-spacer SS3 and the main spacer MS are collinearly arranged along the first direction X.

Figure 4:
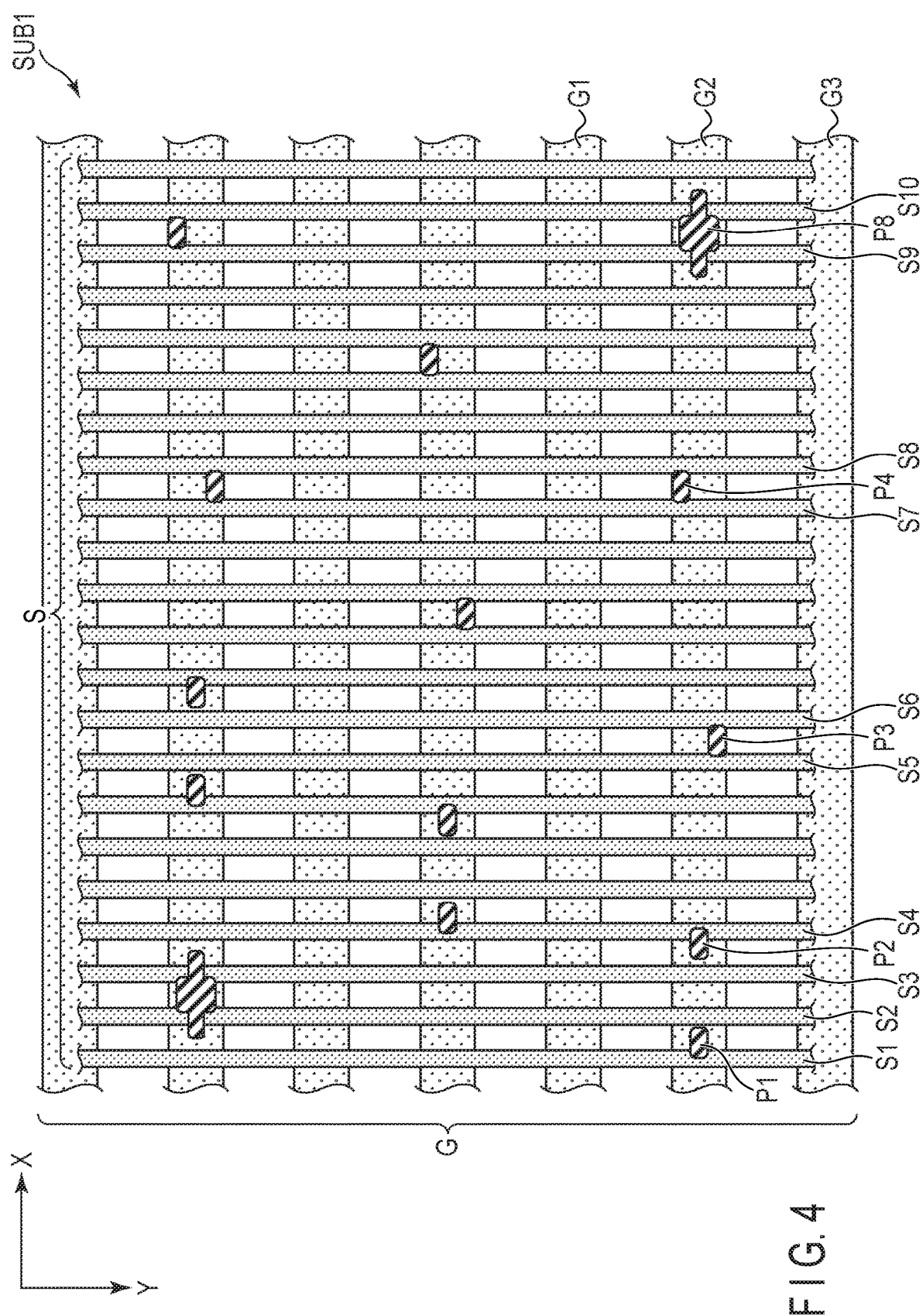
FIG. 4 is a plan view showing a first substrate SUB1 corresponding to the pixel layout shown in FIG. 3.

FIG. 4 is a plan view showing the first substrate SUB1 corresponding to the pixel layout shown in FIG. 3. The illustrations of the switching element, the pixel electrode, the common electrode and the like are omitted here.

The scanning lines G extending in the first direction X include a first scanning line G1, a second scanning line G2 and a third scanning line G3. The first to third scanning lines G1 to G3 are arranged in this order in the second direction Y.

The signal lines S extending in the second direction Y include a first signal line S1, a second signal line S2, a third signal line S3, a fourth signal line S4, a fifth signal line S5, a sixth signal line S6, a seventh signal line S7, an eighth signal line S8, a ninth signal line S9 and a tenth signal line S10. The first to fourth signal lines S1 to S4 are arranged in this order in the first direction X. The fifth signal line S5 and the sixth signal line S6 are arranged adjacent to each other in the first direction X. The seventh signal line S7 and the eighth signal line S8 are arranged adjacent to each other in the first direction X. The ninth signal line S9 and the tenth signal line S10 are arranged adjacent to each other in the first direction X.

The first protrusion portion P1 and the second protrusion portion P2 are disposed on the second scanning line G2, and are arranged in the first direction X. The first protrusion portion P1 is disposed between the first signal line S1 and the second signal line S2, and the second protrusion portion P2 is disposed between the third signal line S3 and the fourth signal line S4.

The third protrusion portion P3 is disposed on a side close to the third scanning line G3 on the second scanning line G2, and is disposed between the fifth signal line S5 and the sixth signal line S6.

The fourth protrusion portion P4 is disposed on a side close to the first scanning line G1 on the second scanning line G2, and is disposed between the seventh signal line S7 and the eighth signal line S8.

The eighth protrusion portion P8 is disposed on the second scanning line G2, extends in the first direction X, and crosses the ninth signal line S9 and the tenth signal line S10.

FIG. 5 is a plan view showing the second substrate SUB2 corresponding to the pixel layout shown in FIG. 3.

The second substrate SUB2 comprises a light-shielding layer LS, a red color filter CFR, a blue color filter CFB and a green color filter CFG.

The light-shielding layer LS comprises an opening OPR corresponding to the red pixel PXR, an opening OPB corresponding to the blue pixel PXB, and an opening OPG corresponding to the green pixel PXG. The area of the opening OPB is less than each of the area of the opening OPR and the area of the opening OPG. In the example shown in FIG. 5, the openings are all substantially equal in length along the first direction X, but the opening OPB is less in length along the second direction Y than each of the openings OPR and OPG. Regardless of the presence or absence of the protrusion portion, the presence or absence of the sub-spacer, and the presence or absence of the main spacer shown in FIG. 3, the areas of the openings OPB are all equal over the entire display region DA. Similarly, the areas of the openings OPR are all equal, and the areas of the openings OPG are all equal. That is, the area contributing to display of the blue pixel PXB is constant over the entire display region DA, and similarly, the area contributing to display of the red pixel PXR and the area contributing to display of the green pixel PXG are constant over the entire display region DA.

The color filter CFR, the color filter CFB and the color filter CFG extend in the second direction Y, and are disposed in the respective openings OP.

In planar view, the fifth protrusion portion P5, the sixth protrusion portion P6, the seventh protrusion portion P7 and the ninth protrusion portion P9 overlap the second scanning line G2. The sixth protrusion portion P6 is disposed on a side close to the first scanning line G1 on the second scanning line G2. The seventh protrusion portion P7 is disposed on a side close to the third scanning line G3 on the second scanning line G2.

Figure 6:
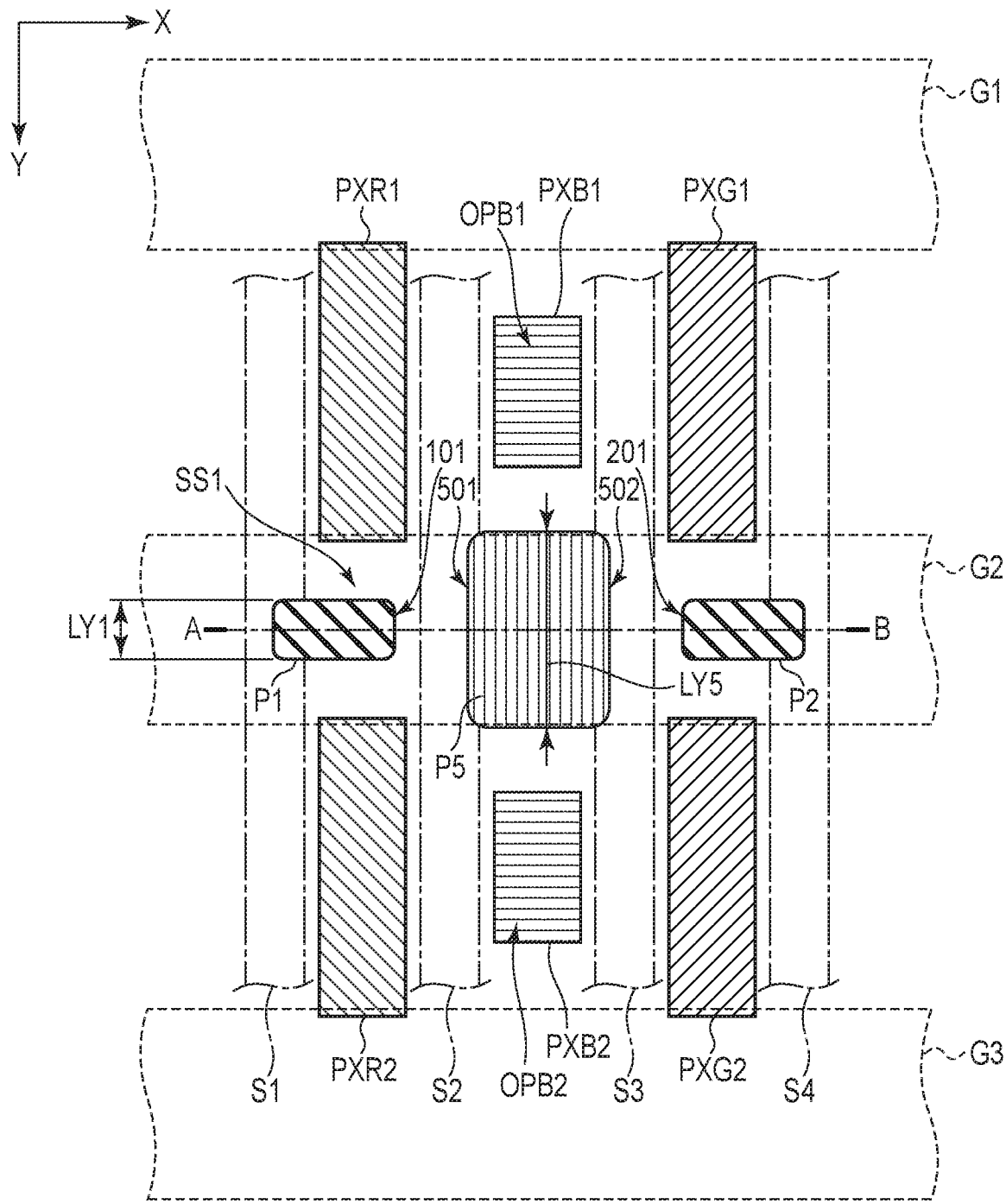
FIG. 6 is an enlarged plan view of a first sub-spacer SS1 shown in FIG. 3.

FIG. 6 is an enlarged plan view of the first sub-spacer SS1 shown in FIG. 3.

The first protrusion portion P1 is disposed between the first signal line S1 and the second signal line S2 arranged in the first direction X, and is disposed between red pixels PXR1 and PXR2 arranged in the second direction Y.

The second protrusion portion P2 is disposed between the third signal line S3 and the fourth signal line S4 arranged in the first direction X, and is disposed between green pixels PXG1 and PXG2 arranged in the second direction Y. The first protrusion portion P1 and the second protrusion portion P2 each are formed in, for example, a substantially rectangular shape extending in the first direction X.

The fifth protrusion portion P5 is disposed between the second signal line S2 and the third signal line S3 arranged in the first direction X, and is disposed between blue pixels PXB1 and PXB2 arranged in the second direction Y. That is, the first protrusion portion P1 and the fifth protrusion portion P5 are adjacent to each other across one second signal line S2, and the second protrusion portion P2 and the fifth protrusion portion P5 are adjacent to each other across one third signal line S3.

The fifth protrusion portion P5 is formed in, for example, a substantially rectangular shape extending in the second direction Y. A length LY5 along the second direction Y of the fifth protrusion portion P5 is greater than a length LY1 along the second direction Y of the first protrusion portion P1. A side surface 501 of the fifth protrusion portion P5 is opposed to a side surface 101 of the first protrusion portion P1 in the first direction X. In addition, a side surface 502 of the fifth protrusion portion P5 is opposed to a side surface 201 of the second protrusion portion P2 in the first direction X.

The area of a first opening OPB1 formed in the blue pixel (first blue pixel) PXB1 is equal to the area of a second opening OPB2 formed in the blue pixel (second blue pixel) PXB2.

Figure 7:
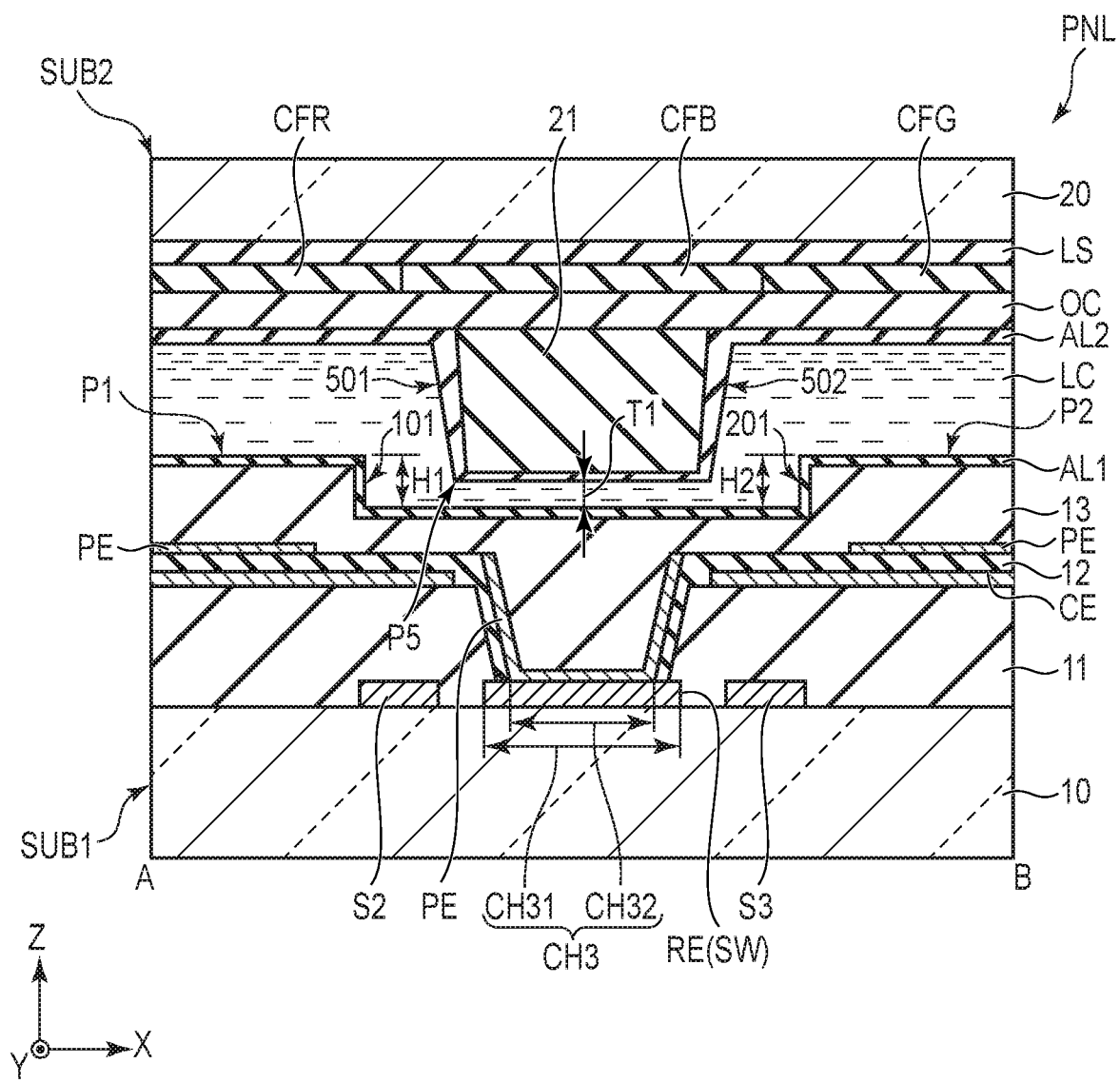
FIG. 7 is a cross-sectional view along line A-B of a display panel PNL including the first sub-spacer SS1 shown in FIG. 6.

FIG. 7 is a cross-sectional view along line A-B of the display panel PNL including the first sub-spacer SS1 shown in FIG. 6.

The first substrate SUB1 comprises an insulating substrate 10, insulating films 11 to 13, the relay electrode PE of the switching element SW, the second signal line S2 and the third signal line S3, the common electrode CE, the pixel electrode PE, an alignment film AL1 and the like. The illustrations of layer structures such as the scanning line, the semiconductor layer and various insulating films located between the insulating substrate 10 and the relay electrode RE and between the insulating substrate 10 and each of the second signal line S2 and the third signal line S3 are omitted.

The insulating film 11 is disposed on the second signal line S2 and the third signal line S3. The insulating film 11 comprises a through hole CH31 penetrating to the relay electrode RE. The common electrode CE is disposed on the insulating film 11 and is covered with the insulating film 12. The insulating film 12 comprises a through hole CH32 penetrating to the relay electrode RE. These through holes CH31 and CH32 form the contact hole CH3 shown in FIG. 2.

The pixel electrode PE located between the second signal line S2 and the third signal line S3 is in contact with the relay electrode RE in the contact hole CH3. The insulating film 13 for forming the first spacer SP1 shown in FIG. 3 is disposed on the pixel electrode PE and the insulating film 12 between the pixel electrodes PE adjacent to each other. A part of the insulating film 13 protrudes toward the second substrate SUB2. In addition, the contact hole CH3 is filled with the insulating film 13. The alignment film AL1 is disposed on the insulating film 13.

The insulating film 11 corresponds to a first organic insulating film formed of a transparent organic insulating material. The insulating film 12 corresponds to an inorganic insulating film formed of a transparent inorganic insulating material such as silicon nitride, for example. The insulating film 13 corresponds to a second organic insulating film formed of a transparent organic insulating material. The common electrode CE and the pixel electrode PE each correspond to a transparent electrode formed of a transparent conductive material such as indium tin oxide (ITO) or indium zinc oxide (IZO).

The second substrate SUB2 comprises an insulating substrate 20, the light-shielding layer LS, the color filters CFR, CFG and CFB, an overcoat layer OC, an insulating film 21, an alignment film AL2 and the like. The light-shielding layer LS is disposed on a side of the insulating substrate 20 which is opposed to the first substrate SUB1. The color filers CFR, CFG and CFB overlap the light-shielding layer LS. The overcoat layer OC covers the color filters CFR, CFG and CFB.

The insulating film 21 for forming the second spacer SP2 shown in FIG. 3 is disposed directly under the light-shielding layer LS and the color filter CFB, and protrudes toward the first substrate SUB1. In addition, the insulating film 21 is located directly above the contact hole CH3. Note that the insulating film 21 is not disposed directly under the color filters CFR and CFG. The alignment film AL2 covers the overcoat layer OC, and covers at least a part of the insulating film 21.

The insulating substrates 10 and 20 each are a transparent substrate such as a glass substrate or a resin substrate. The alignment films AL1 and AL2 each are a horizontal alignment film having an alignment restriction force along the XY-plane, for example, but may each be a vertical alignment film having an alignment restriction force along the third direction Z. The insulating film 21 corresponds to an organic insulating film formed of a transparent organic insulating material.

The first protrusion portion P1 and the second protrusion portion P2 each include a part of the insulating film 13 which protrudes toward the second substrate SUB2, and the alignment film AL1. The first protrusion portion P1 is located directly under the light-shielding layer LS and the color filter CFR, and the second protrusion portion P2 is located directly under the light-shielding layer LS and the color filter CFG. The insulating film 21 is not disposed directly above the first protrusion portion P1 and the second protrusion portion P2. A concave portion of the first substrate SUB1 is formed between the first protrusion portion P1 and the second protrusion portion P2. The first protrusion portion P1 and the second protrusion portion P2 are apart from the second substrate SUB2 or the alignment film AL2. That is, the liquid crystal layer LC is interposed between the first protrusion portion P1 and the alignment film AL2 and between the second protrusion portion P2 and the alignment film AL2 in the third direction Z.

The fifth protrusion portion P5 includes the insulating film 21 and the alignment film AL2. The fifth protrusion portion P5 is located directly under the light-shielding layer LS and the color filter CFB. The fifth protrusion portion P5 is apart from the first substrate SUB1 or the alignment film AL1. That is, the liquid crystal layer LC is interposed between the fifth protrusion portion P5 and the alignment film AL1 in the third direction Z.

A height H1 along the third direction Z of the first protrusion portion P1 and a height H2 along the third direction Z of the second protrusion portion P2 are equal to each other, but are greater than a thickness T1 of the liquid crystal layer LC located between the fifth protrusion portion P5 and the first substrate SUB1. That is, the point of the fifth protrusion portion P5 goes in between the first protrusion portion P1 and the second protrusion portion P2. In other words, the fifth protrusion portion P5 enters the concave portion of the first substrate SUB1.

In the first sub-spacer SS1 shown in FIGS. 6 and 7, for example, if the second substrate SUB2 is displaced in the direction of an arrow indicating the first direction X with respect to the first substrate SUB1, the side surface 502 of the fifth protrusion portion P5 contacts the side surface 201 of the second protrusion portion P2. In addition, if the second substrate SUB2 is displaced in a direction opposite to the arrow indicating the first direction X with respect to the first substrate SUB1, the side surface 501 of the fifth protrusion portion P5 contacts the side surface 101 of the first protrusion portion P1. Accordingly, excessive displacements along the first direction X are suppressed.

In the example shown in FIG. 7, the pixel electrodes PE may not be disposed directly under the first protrusion portion P1 and directly under the second protrusion portion P2, and the contact hole CH3 may not be disposed directly under the fifth protrusion portion P5.

Figure 8:
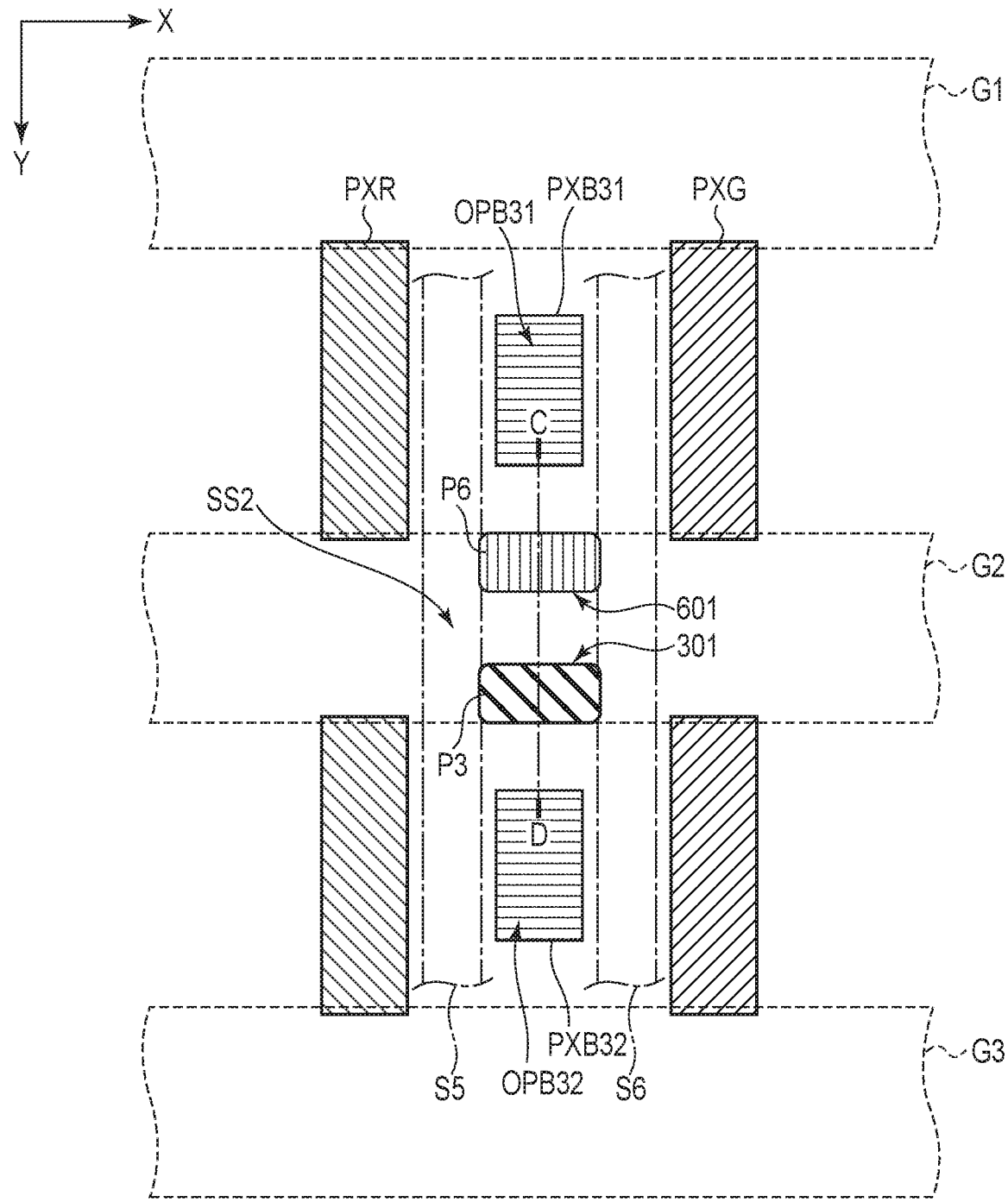
FIG. 8 is an enlarged plan view of a second sub-spacer SS2 shown in FIG. 3.

FIG. 8 is an enlarged plan view of the second sub-spacer SS2 shown in FIG. 3.

The third protrusion portion P3 and the sixth protrusion portion P6 are disposed between the fifth signal line S5 and the sixth signal line S6 arranged in the first direction X, and are disposed between blue pixels PXB31 and PXB32 arranged in the second direction Y. The third protrusion portion P3 and the sixth protrusion portion P6 are arranged in the second direction Y, and the sixth protrusion portion P6 is disposed between the blue pixel (third blue pixel) PXB31 and the third protrusion portion P3.

The third protrusion portion P3 and the sixth protrusion portion P6 each are formed in, for example, a substantially rectangular shape extending in the first direction X. A side surface 301 of the third protrusion portion P3 is opposed to a side surface 601 of the sixth protrusion portion P6 in the second direction Y.

The area of an opening OPB31 formed in the blue pixel PXB31 is equal to the area of an opening OPB32 formed in the blue pixel PXB32.

No protrusion portion is formed between the red pixels PXR arranged in the second direction Y and between the green pixels PXG arranged in the second direction Y around the second sub-spacer SS2.

Figure 9:
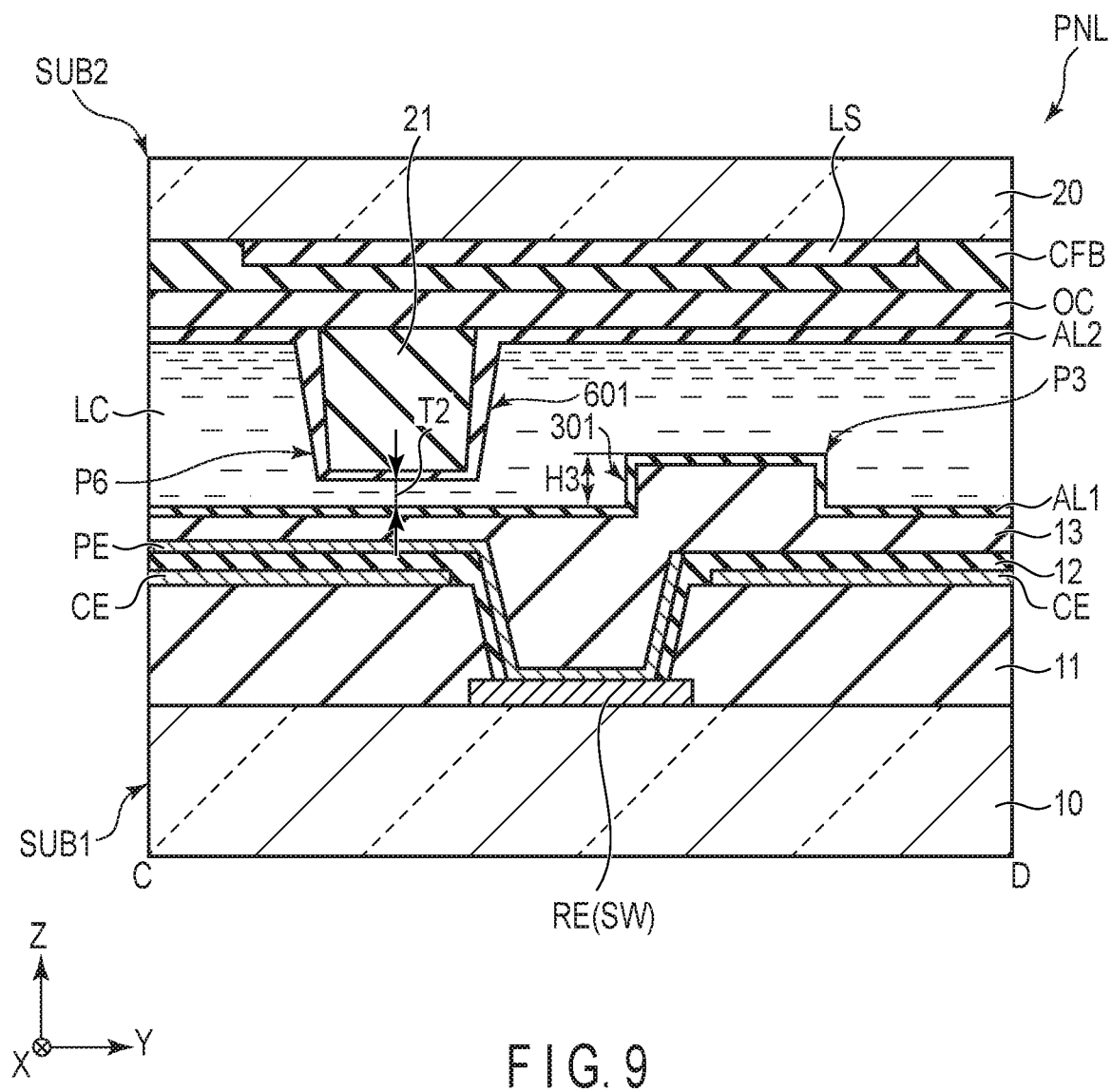
FIG. 9 is a cross-sectional view along line C-D of the display panel PNL including the second sub-spacer SS2 shown in FIG. 8.

FIG. 9 is a cross-sectional view along line C-D of the display panel PNL including the second sub-spacer SS2 shown in FIG. 8.

The third protrusion portion P3 includes a part of the insulating film 13 which protrudes toward the second substrate SUB2, and the alignment film AL1. The third protrusion portion P3 is located directly under the light-shielding layer LS and the color filter CFB. The insulating film 21 is not disposed directly above the third protrusion portion P3. The third protrusion portion P3 is apart from the second substrate SUB2. That is, the liquid crystal layer LC is interposed between the third protrusion portion P3 and the alignment film AL2 in the third direction Z.

The sixth protrusion portion P6 includes the insulating film 21 and the alignment film AL2. The sixth protrusion portion P6 is located directly under the light-shielding layer LS and the color filter CFB. The sixth protrusion portion P6 is apart from the first substrate SUB1. That is, the liquid crystal layer LC is interposed between the sixth protrusion portion P6 and the alignment film AL1 in the third direction Z.

A height H3 along the third direction Z of the third protrusion portion P3 is greater than a thickness T2 of the liquid crystal layer LC located between the sixth protrusion portion P6 and the first substrate SUB1.

In the second sub-spacer SS2 shown in FIGS. 8 and 9, for example, if the second substrate SUB2 is displaced in the direction of an arrow indicating the second direction Y with respect to the first substrate SUB1, the side surface 601 of the sixth protrusion portion P6 contacts the side surface 301 of the third protrusion portion P3. Accordingly, an excessive displacement along the second direction Y is suppressed.

Figure 10:
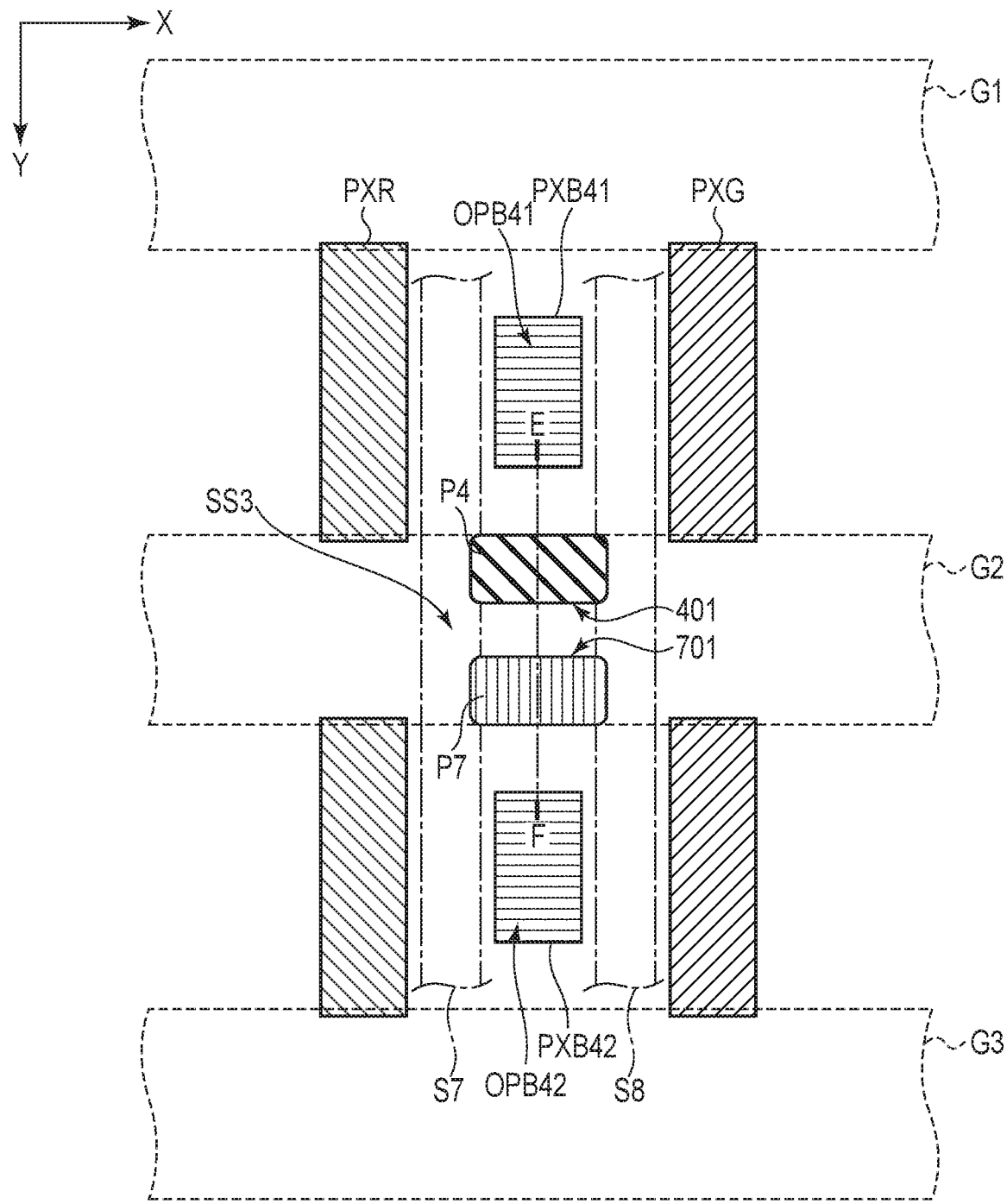
FIG. 10 is an enlarged plan view of a third sub-spacer SS3 shown in FIG. 3.

FIG. 10 is an enlarged plan view of the third sub-spacer SS3 shown in FIG. 3.

The fourth protrusion portion P4 and the seventh protrusion portion P7 are disposed between the seventh signal line S7 and the eighth signal line S8 arranged in the first direction X, and are disposed between blue pixels PXB41 and PXB42 arranged in the second direction Y. The fourth protrusion portion P4 and the seventh protrusion portion P7 are arranged in the second direction Y, and the fourth protrusion portion P4 is disposed between the blue pixel (fourth blue pixel) PXB41 and the seventh protrusion portion P7.

The fourth protrusion portion P4 and the seventh protrusion portion P7 each are formed in, for example, a substantially rectangular shape extending in the first direction X. A side surface 401 of the fourth protrusion portion P4 is opposed to a side surface 701 of the seventh protrusion portion P7 in the second direction Y.

The area of an opening OPB41 formed in the blue pixel PXB41 is equal to the area of an opening OPB42 formed in the blue pixel PXB42.

No protrusion portion is formed between the red pixels PXR arranged in the second direction Y and between the green pixels PXG arranged in the second direction Y around the third sub-spacer SS3.

Figure 11:
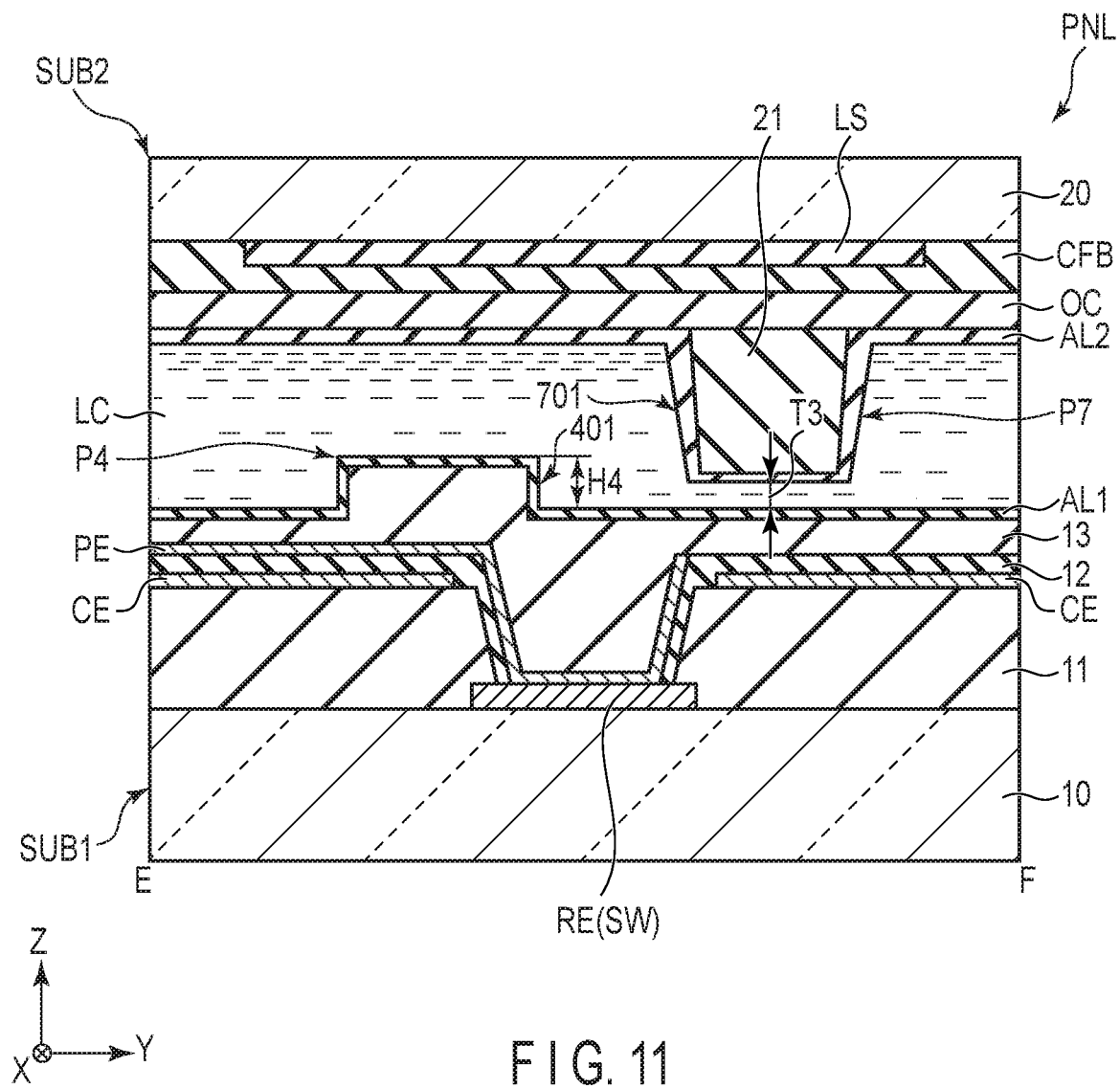
FIG. 11 is a cross-sectional view along line E-F of the display panel PNL including the third sub-spacer SS3 shown in FIG. 10.

FIG. 11 is a cross-sectional view along line E-F of the display panel PNL including the third sub-spacer SS3 shown in FIG. 10.

The fourth protrusion portion P4 includes a part of the insulating film 13 which protrudes toward the second substrate SUB2, and the alignment film AL1. The fourth protrusion portion P4 is located directly under the light-shielding layer LS and the color filter CFB. The insulating film 21 is not disposed directly above the fourth protrusion portion P4. The fourth protrusion portion P4 is apart from the second substrate SUB2. That is, the liquid crystal layer LC is interposed between the fourth protrusion portion P4 and the alignment film AL2 in the third direction Z.

The seventh protrusion portion P7 includes the insulating film 21 and the alignment film AL2. The seventh protrusion portion P7 is located directly under the light-shielding layer LS and the color filter CFB. The seventh protrusion portion P7 is apart from the first substrate SUB1. That is, the liquid crystal layer LC is interposed between the seventh protrusion portion P7 and the alignment film AL1 in the third direction Z.

A height H4 along the third direction Z of the fourth protrusion portion P4 is greater than a thickness T3 of the liquid crystal layer LC located between the seventh protrusion portion P7 and the first substrate SUB1.

In the third sub-spacer SS3 shown in FIGS. 10 and 11, for example, if the second substrate SUB2 is displaced in a direction opposite to an arrow indicating the second direction Y with respect to the first substrate SUB1, the side surface 701 of the seventh protrusion portion P7 contacts the side surface 401 of the fourth protrusion portion P4. Accordingly, an excessive displacement along the second direction Y is suppressed.

Figure 12:
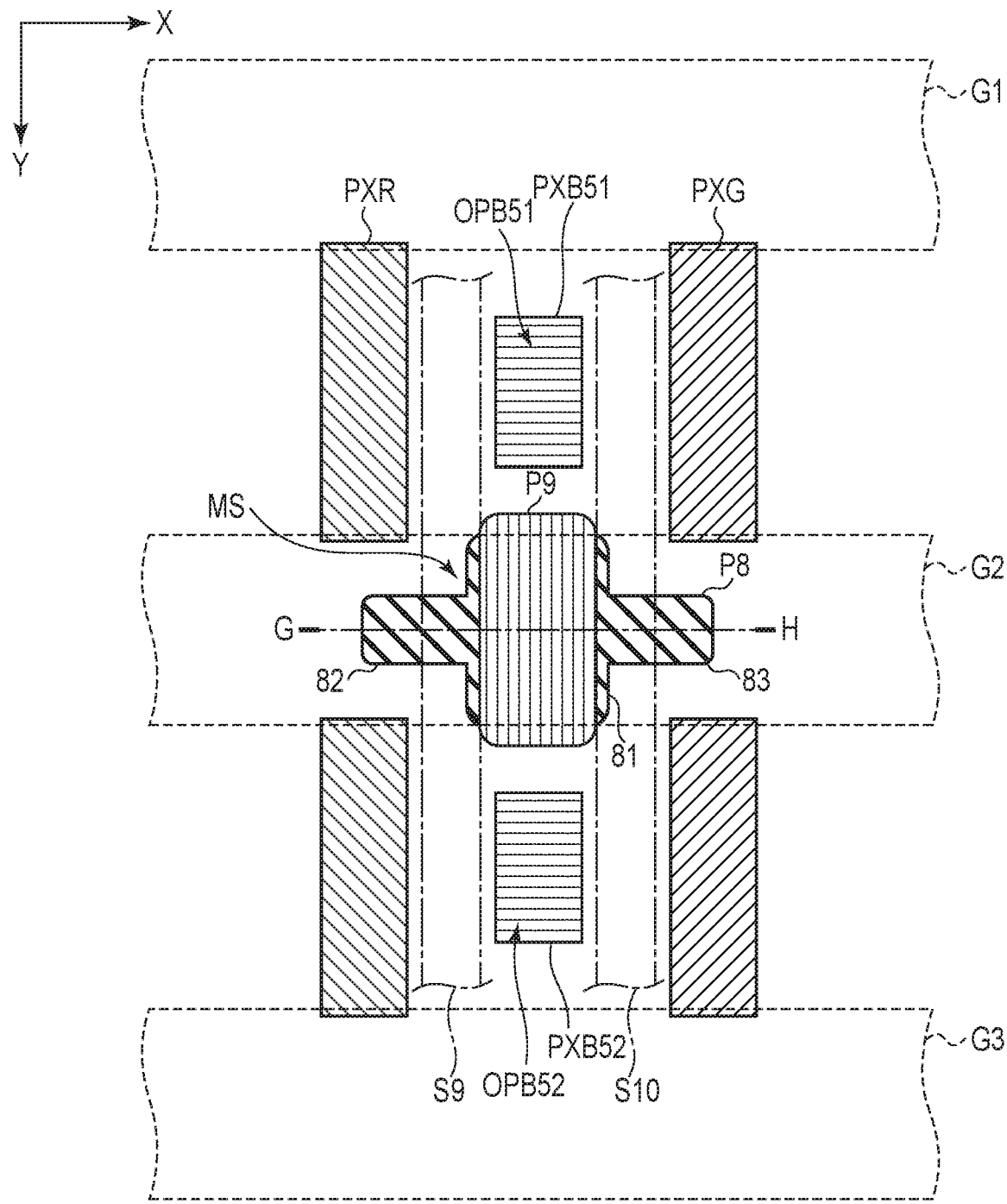
FIG. 12 is an enlarged plan view of a main spacer MS shown in FIG. 3.

FIG. 12 is an enlarged plan view of the main spacer MS shown in FIG. 3.

The eighth protrusion portion P8 comprises a first portion 81, a second portion 82 and a third portion 83. The first portion 81 is disposed between the ninth signal line S9 and the tenth signal line S10 arranged in the first direction X, and is disposed between blue pixels PXB51 and PXB52 arranged in the second direction Y. The second portion 82 crosses the ninth signal line S9 and extends in the first direction X. A part of the second portion 82 is disposed between the red pixels PXR arranged in the second direction Y. The third portion 83 crosses the tenth signal line S10 and extends in the first direction X. A part of the third portion 83 is disposed between the green pixels PXG arranged in the second direction Y. The first portion 81, the second portion 82 and the third portion 83 are integrally formed with one another. The width along the second direction Y of each of the second portion 82 and the third portion 83 is less than the width along the second direction Y of the first portion 81.

The ninth protrusion portion P9 is disposed between the ninth signal line S9 and the tenth signal line S10, and overlaps the first portion 81.

The first portion 81 and the ninth protrusion portion P9 each are formed in, for example, a substantially rectangular shape extending in the second direction Y. The second portion 82 and the third portion 83 each are formed in, for example, a substantially rectangular shape extending in the first direction X.

The area of an opening OPB51 formed in the blue pixel PXB51 is equal to the area of an opening OPB52 formed in the blue pixel PXB52.

Figure 13:
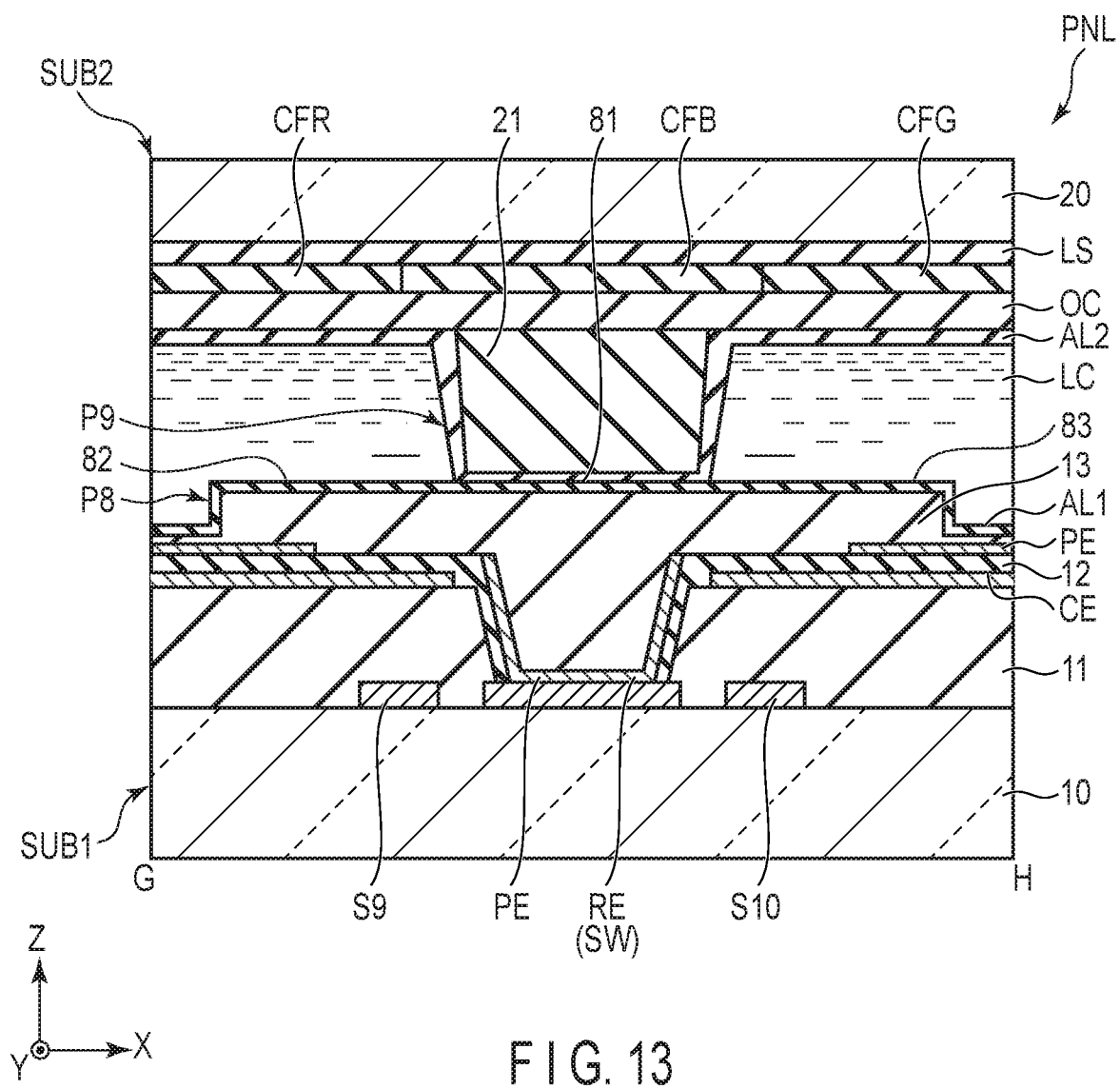
FIG. 13 is a cross-sectional view along line G-H of the display panel PNL including the main spacer MS shown in FIG. 12.

FIG. 13 is a cross-sectional view along line G-H of the display panel PNL including the main spacer MS shown in FIG. 12.

The eighth protrusion portion P8 includes a part of the insulating film 13 which protrudes toward the second substrate SUB2, and the alignment film AL1. The ninth protrusion portion P9 includes the insulating film 21 and the alignment film AL2. The eighth protrusion portion P8 and the ninth protrusion portion P9 are located directly under the light-shielding layer LS and the color filter CFB. The eighth protrusion portion P8 and the ninth protrusion portion P9 are opposed to each other in the third direction Z, and the points of them are in contact with each other. That is, the liquid crystal layer LC is not interposed between the eighth protrusion portion P8 and the ninth protrusion portion P9. The main spacer MS composed as described above forms a cell gap for holding the liquid crystal layer LC.

In the main spacer MS, for example, if the second substrate SUB2 is displaced in the first direction X with respect to the first substrate SUB1, the contact position of the ninth protrusion portion P9 and the eighth protrusion portion P8 moves from the first portion 81 to the second portion 82 or the third portion 83, but the contact state of the eighth protrusion portion P8 and the ninth protrusion portion P9 is maintained. Therefore, the predetermined cell gap is maintained.

According to the present embodiment, excessive displacements along the first direction X of the second substrate SUB2 with respect to the first substrate SUB1 can be suppressed by the first sub-spacer SS1. In addition, excessive displacements along the second direction Y of the second substrate SUB2 with respect to the first substrate SUB1 can be suppressed by the second sub-spacer SS2 and the third sub-spacer SS3.

Therefore, damage to the alignment film AL2 from the displacement of the first substrate SUB1 side protrusion portion (first spacer SP1) and damage to the alignment film AL1 from the displacement of the second substrate SUB2 side protrusion portion (second spacer SP2) can be suppressed. Consequently, the area of the light-shielding layer LS spreading around these protrusion portions can be reduced, and the decrease of the area contributing to display of each pixel PX can be suppressed.

In addition, regardless of the presence or absence of the protrusion portion, the presence or absence of the sub-spacer, and the presence or absence of the main spacer, the areas of all the openings OPB are equal, the areas of all the openings OPR are equal, and the areas of all the openings OPG are equal over the entire display region DA. Therefore, the area ratio of the openings OPR, OPG and OPB is constant over the entire display region DA, and adjustment of color balance is not required. Furthermore, the decrease of the transmittance of the entire display region DA can be suppressed.

Accordingly, deterioration of display quality can be suppressed.

Figure 14:
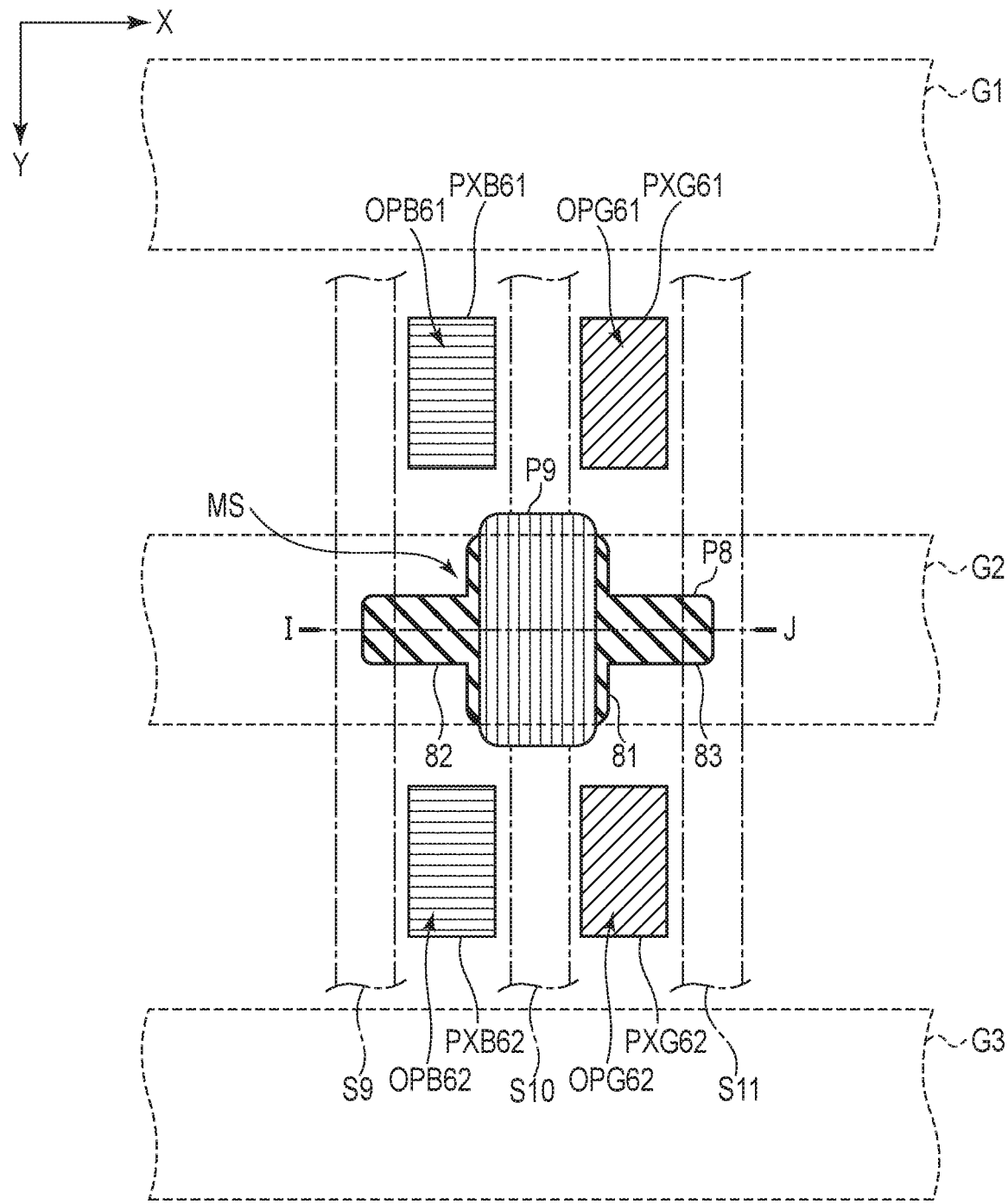
FIG. 14 is an enlarged plan view of a modification example of the main spacer MS.

FIG. 14 is an enlarged plan view of a modification example of the main spacer MS. The modification example shown in FIG. 14 is different from the example shown in FIG. 12 in that the main spacer MS is disposed between blue pixels PXB61 and PXB62 arranged in the second direction Y and between green pixels PXG61 and PXG62 arranged in the second direction Y. The main spacer MS may be disposed between the red pixels arranged in the second direction Y instead of the green pixels.

In the eighth protrusion portion P8, the first portion 81 overlaps the tenth signal line S10. The second portion 82 is disposed between the ninth signal line S9 and the tenth signal line S10 arranged in the first direction X, and is disposed between the blue pixels PXB61 and PXB62 arranged in the second direction Y. The third portion 83 is disposed between the tenth signal line S10 and the eleventh signal line S11 arranged in the first direction X, and is disposed between the green pixels PXG61 and PXG62 arranged in the second direction Y. The second portion 82 and the third portion 83 extend in the first direction X.

The ninth protrusion portion P9 overlaps the first portion 81.

The area of an opening OPB61 formed in the blue pixel PXB61 is equal to the area of an opening OPB62 formed in the blue pixel PXB62. The area of an opening OPG61 formed in the green pixel PXG61 is equal to the area of an opening OPG62 formed in the green pixel PXG62. In addition, the area of the opening OPB61 is equal to the area of the opening OPG61.

Figure 15:
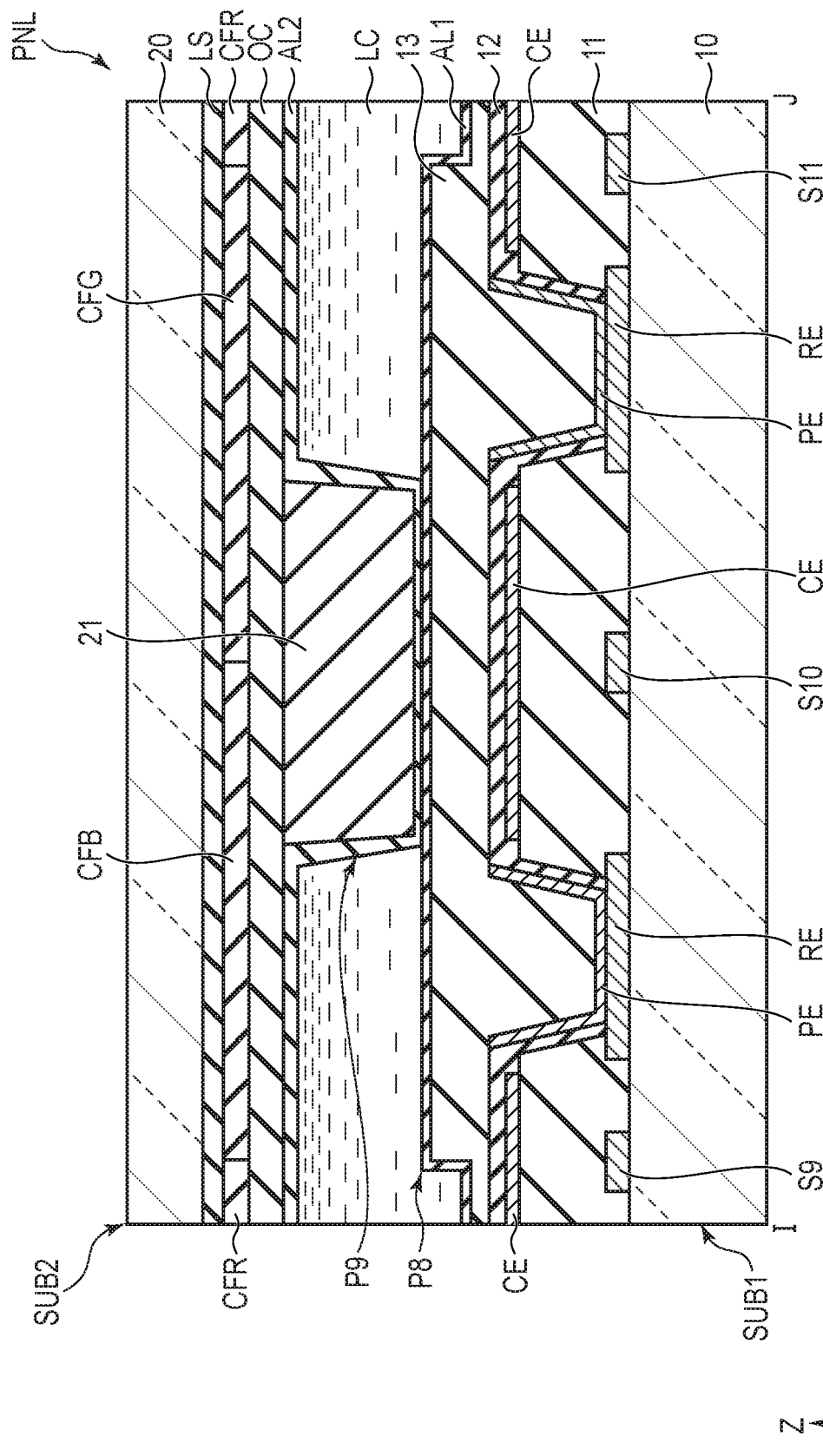
FIG. 15 is a cross-sectional view along line I-J of the display panel PNL including the main spacer MS shown in FIG. 14.

FIG. 15 is a cross-sectional view along line I-J of the display panel PNL including the main spacer MS shown in FIG. 14.

The eighth protrusion portion P8 includes a part of the insulating film 13 which protrudes toward the second substrate SUB2, and the alignment film AL1. The ninth protrusion portion P9 includes the insulating film 21 and the alignment film AL2. The eighth protrusion portion P8 and the ninth protrusion portion P9 are located directly under the light-shielding layer LS and the color filters CFB and CFG. The eighth protrusion portion P8 and the ninth protrusion portion P9 are opposed to each other in the third direction Z, and the points of them are in contact with each other. The main spacer MS composed as described above forms a cell gap for holding the liquid crystal layer LC.

Effects similar to those described above are also obtained when the main spacer MS shown in FIGS. 14 and 15 is applied.

FIG. 16 is an enlarged plan view of a modification example of the sub-spacer SS. The sub-spacer SS of the modification example shown in FIG. 16 can replace the second sub-spacer SS2 and the third sub-spacer SS3.

The third protrusion portion P3, the fourth protrusion portion P4, the sixth protrusion portion P6 and the seventh protrusion portion P7 are disposed between the fifth signal line S5 and the sixth signal line S6 arranged in the first direction X, and are disposed between the blue pixels PXB arranged in the second direction Y.

The third protrusion portion P3 and the seventh protrusion portion P7 are disposed on a side close to the third scanning line G3 on the second scanning line G2, and are arranged in the first direction X. The fourth protrusion portion P4 and the sixth protrusion portion P6 are disposed on a side close to the first scanning line G1 on the second scanning line G2, and are arranged in the first direction X. In addition, the third protrusion portion P3 and the sixth protrusion portion P6 are arranged in the second direction Y along the fifth signal line S5. The fourth protrusion portion P4 and the seventh protrusion portion P7 are arranged in the second direction Y along the sixth signal line S6.

The side surface 301 of the third protrusion portion P3 is opposed to the side surface 601 of the sixth protrusion portion P6 in the second direction Y. A side surface 302 of the third protrusion portion P3 is opposed to a side surface 702 of the seventh protrusion portion P7 in the first direction X. The side surface 401 of the fourth protrusion portion P4 is opposed to the side surface 701 of the seventh protrusion portion P7 in the second direction Y. A side surface 402 of the fourth protrusion portion P4 is opposed to a side surface 602 of the sixth protrusion portion P6 in the first direction X.

FIGS. 17A to 17D are illustrations for explaining the effect of the sub-spacer SS shown in FIG. 16.

Figure 17A:
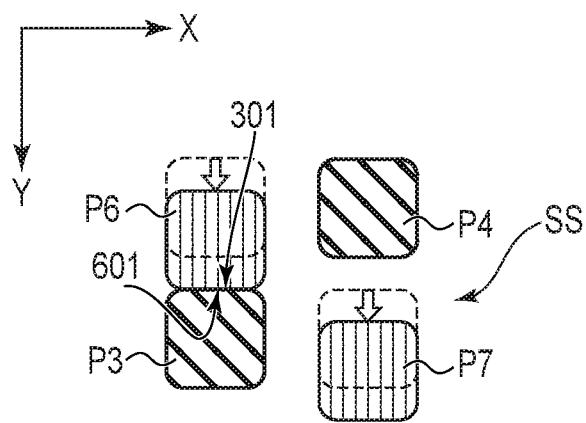
FIGS. 17A to 17D are illustrations for explaining the effects of the sub-spacer SS shown in FIG. 16.

As shown in FIG. 17A, in the sub-spacer SS, if the second substrate SUB2 is displaced in the direction of an arrow indicating the second direction Y with respect to the first substrate SUB1, the seventh protrusion portion P7 moves away from the fourth protrusion portion P4, but the sixth protrusion portion P6 moves toward the third protrusion portion P3, and the side surface 601 of the sixth protrusion portion P6 contacts the side surface 301 of the third protrusion portion P3.

Figure 17B:
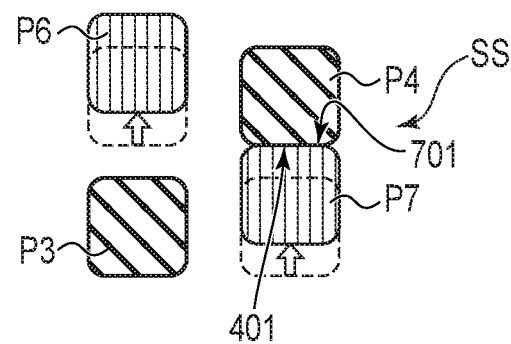

As shown in FIG. 17B, if the second substrate SUB2 is displaced in a direction opposite to the arrow indicating the second direction Y with respect to the first substrate SUB1, the sixth protrusion portion P6 moves away from the third protrusion portion P3, but the seventh protrusion portion P7 moves toward the fourth protrusion portion P4, and the side surface 701 of the seventh protrusion portion P7 contacts the side surface 401 of the fourth protrusion portion P4.

Accordingly, excessive displacements along the second direction Y are suppressed. This sub-spacer SS can replace the second sub-spacer SS2 and the third sub-spacer SS3.

Figure 17C:
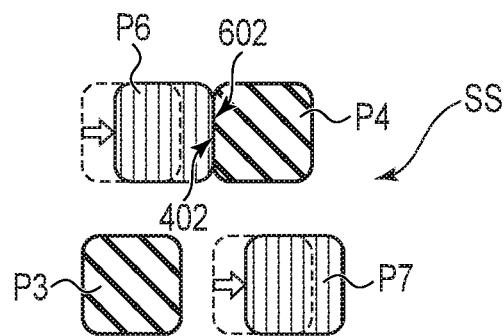

As shown in FIG. 17C, in the sub-spacer SS, if the second substrate SUB2 is displaced in the direction of an arrow indicating the first direction X with respect to the first substrate SUB1, the seventh protrusion portion P7 moves away from the third protrusion portion P3, but the sixth protrusion portion P6 moves toward the fourth protrusion portion P4, and the side surface 602 of the sixth protrusion portion P6 contacts the side surface 402 of the fourth protrusion portion P4.

Figure 17D:
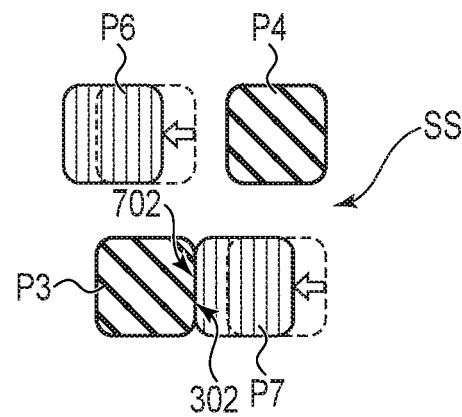

As shown in FIG. 17D, if the second substrate SUB2 is displaced in a direction opposite to the arrow indicating the first direction X with respect to the first substrate SUB1, the sixth protrusion portion P6 moves away from the fourth protrusion portion P4, but the seventh protrusion portion P7 moves toward the third protrusion portion P3, and the side surface 702 of the seventh protrusion portion P7 contacts the side surface 302 of the third protrusion portion P3.

Accordingly, excessive displacements along the first direction X are suppressed. This sub-spacer SS can replace the first sub-spacer SS1. That is, the first to third sub-spacers SS1 to SS3 can be omitted by applying the sub-spacer SS1 shown in FIG. 16.

FIG. 18 is an enlarged plan view of another modification example of the sub-spacer SS. The sub-spacer SS of the modification example shown in FIG. 18 can replace the sub-spacer SS shown in FIG. 16.

The third protrusion portion P3 and the sixth protrusion portion P6 are disposed between the fifth signal line S5 and the sixth signal line S6 arranged in the first direction X, and are disposed between the blue pixels PXB arranged in the second direction Y.

The fourth protrusion portion P4 and the seventh protrusion portion P7 are disposed between the seventh signal line S7 and the eighth signal line S8 arranged in the first direction X, and are disposed between the blue pixels PXB arranged in the second direction Y. The third protrusion portion P3, the fourth protrusion portion P4, the sixth protrusion portion P6 and the seventh protrusion portion P7 are disposed on the second scanning line G2.

The third protrusion portion P3 comprises a first portion 31 extending in the first direction X on a side close to the third scanning line G3, and a second portion 32 extending in the second direction Y along the fifth signal line S5. The sixth protrusion portion P6 comprises a portion 61 extending in the first direction X on a side close to the first scanning line G1, and a portion 62 extending in the second direction Y along the sixth signal line S6.

The first portion 31 and the portion 61 are arranged in the second direction Y, and the first portion 31 and the portion 62 are arranged in the first direction X. In addition, the second portion 32 and the portion 61 are arranged in the first direction X.

A side surface 311 of the first portion 31 is opposed to a side surface 621 of the portion 62 in the first direction X. A side surface 312 of the first portion 31 is opposed to a side surface 611 of the portion 61 in the second direction Y. A side surface 321 of the second portion 32 is opposed to a side surface 612 of the portion 61 in the first direction X.

The fourth protrusion portion P4 comprises a third portion 43 extending in the first direction X on a side close to the first scanning line G1, and a fourth portion 44 extending in the second direction Y along the eighth signal line S8. The seventh protrusion portion P7 comprises a portion 73 extending in the first direction X on a side close to the third scanning line G3, and a portion 74 extending in the second direction Y along the seventh signal line S7.

The third portion 43 and the portion 73 are arranged in the second direction Y, and the third portion 43 and the portion 74 are arranged in the first direction X. In addition, the fourth portion 44 and the portion 73 are arranged in the first direction X.

A side surface 431 of the third portion 43 is opposed to a side surface 741 of the portion 74 in the first direction X. A side surface 432 of the third portion 43 is opposed to a side surface 731 of the portion 73 in the second direction Y. A side surface 441 of the fourth portion 44 is opposed to a side surface 732 of the portion 73 in the first direction X.

FIGS. 19A to 19D are illustrations for explaining the effects of the sub-spacer SS shown in FIG. 18.

Figure 19A:
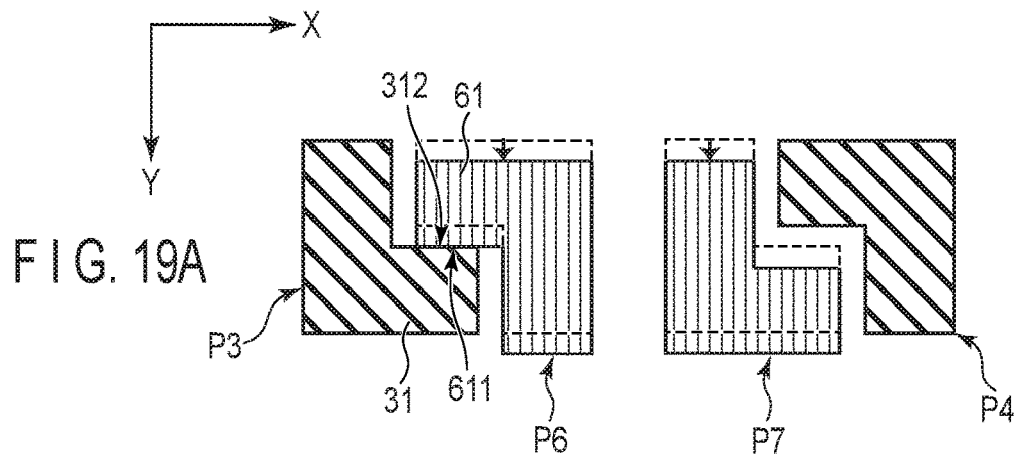
FIGS. 19A to 19D are illustrations for explaining the effects of the sub-spacer SS shown in FIG. 18.

As shown in FIG. 19A, in the sub-spacer SS, if the second substrate SUB2 is displaced in the direction of an arrow indicating the second direction Y with respect to the first substrate SUB1, the sixth protrusion portion P6 moves toward the third protrusion portion P3, and the side surface 611 of the portion 61 contacts the side surface 312 of the first portion 31.

Figure 19B:
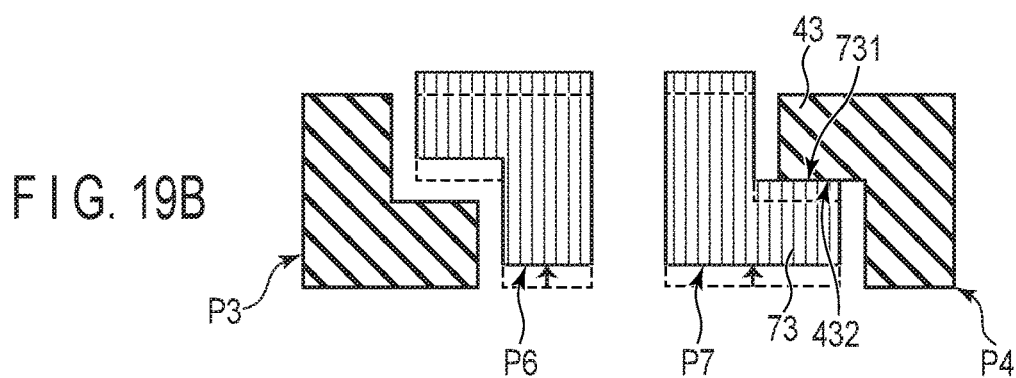

As shown in FIG. 19B, if the second substrate SUB2 is displaced in a direction opposite to the arrow indicating the second direction Y with respect to the first substrate SUB1, the seventh protrusion portion P7 moves toward the fourth protrusion portion P4, and the side surface 731 of the portion 73 contacts the side surface 432 of the third portion 43. Accordingly, excessive displacements along the second direction Y are suppressed. This sub-spacer SS can replace the second sub-spacer SS2 and the third sub-spacer SS3.

Figure 19C:
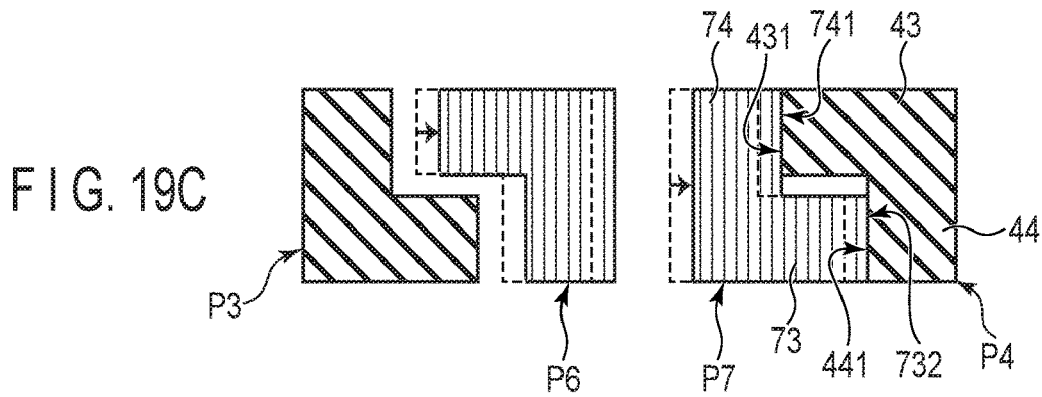

As shown in FIG. 19C, in the sub-spacer SS, if the second substrate SUB2 is displaced in the direction of an arrow indicating the first direction X with respect to the first substrate SUB1, the seventh protrusion portion P7 moves toward the fourth protrusion portion P4, the side surface 741 of the portion 74 contacts the side surface 431 of the third portion 43, and the side surface 732 of the portion 73 contacts the side surface 411 of the fourth portion 44.

Figure 19D:
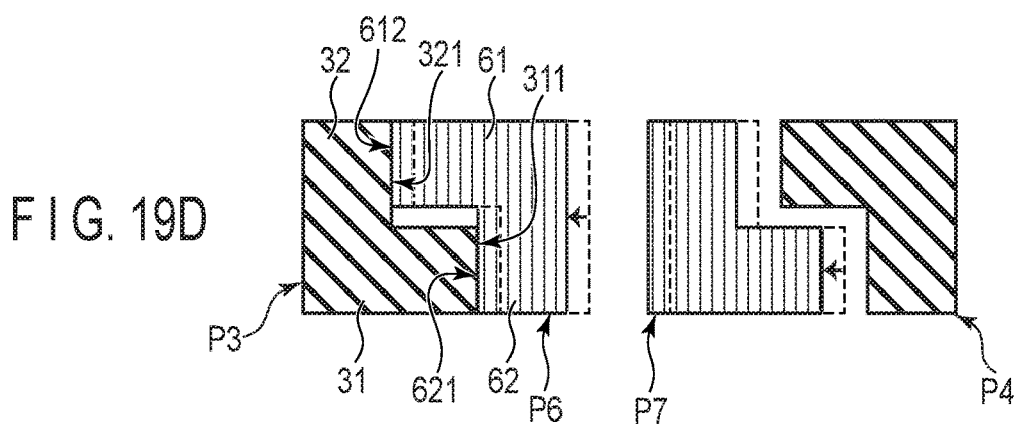

As shown in FIG. 19D, if the second substrate SUB2 is displaced in a direction opposite to the arrow indicating the first direction X with respect to the first substrate SUB1, the sixth protrusion portion P6 moves toward the third protrusion portion P3, the side surface 612 of the portion 61 contacts the side surface 321 of the second portion 32, and the side surface 621 of the portion 62 contacts the side surface 311 of the first portion 31.

Accordingly, excessive displacements along the first direction X are suppressed. This sub-spacer SS can replace the first sub-spacer SS1. That is, the first to third sub-spacers SS1 to SS3 can be omitted by applying the sub-spacer SS shown in FIG. 18.

As described above, according to the present embodiment, a display device capable of suppressing deterioration of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising first to third scanning lines extending in a first direction and arranged in order in a second direction, a plurality of signal lines extending in the second direction, a first protrusion portion and a second protrusion portion disposed on the second scanning line and arranged in the first direction, a third protrusion portion disposed on a side close to the third scanning line on the second scanning line, and a fourth protrusion portion disposed on a side close to the first scanning line on the second scanning line;
a second substrate comprising a fifth protrusion portion disposed between the first protrusion portion and the second protrusion portion, a sixth protrusion portion disposed on a side close to the first scanning line on the second scanning line, and a seventh protrusion portion disposed on a side close to the third scanning line on the second scanning line in planar view; and
a liquid crystal layer held between the first substrate and the second substrate, wherein
the first to fourth protrusion portions are apart from the second substrate,
the fifth to seventh protrusion portions are apart from the first substrate,
the third protrusion portion and the sixth protrusion portion are arranged in the second direction, and
the fourth protrusion portion and the seventh protrusion portion are arranged in the second direction.

2. The display device of claim 1, wherein
the signal lines include first to fourth signal lines arranged in order in the first direction,
the first protrusion portion is disposed between the first signal line and the second signal line,
the second protrusion portion is disposed between the third signal line and the fourth signal line, and
the fifth protrusion portion is disposed between the second signal line and the third signal line.

3. The display device of claim 2, further comprising:
a first blue pixel surrounded by the first scanning line and the second scanning line, and the second signal line and the third signal line; and
a second blue pixel surrounded by the second scanning line and the third scanning line, and the second signal line and the third signal line, wherein
the fifth protrusion portion is disposed between the first blue pixel and the second blue pixel.

4. The display device of claim 3, wherein
the second substrate comprises a light-shielding layer comprising a first opening formed in the first blue pixel and a second opening formed in the second blue pixel, and
an area of the first opening is equal to an area of the second opening.

5. The display device of claim 2, wherein
a height of the first protrusion portion and a height of the second protrusion portion each are greater than a thickness of the liquid crystal layer located between the fifth protrusion portion and the first substrate.

6. The display device of claim 2, wherein
the signal lines include a fifth signal line and a sixth signal line arranged in order in the first direction, and
the third protrusion portion and the sixth protrusion portion are disposed between the fifth signal line and the sixth signal line.

7. The display device of claim 6, further comprising a third blue pixel surrounded by the first scanning line and the second scanning line, and the fifth signal line and the sixth signal line, wherein
the sixth protrusion portion is disposed between the third blue pixel and the third protrusion portion.

8. The display device of claim 6, wherein
a height of the third protrusion portion is greater than a thickness of the liquid crystal layer located between the sixth protrusion portion and the first substrate.

9. The display device of claim 6, wherein
the signal lines include a seventh signal line and an eighth signal line arranged in order in the first direction, and
the fourth protrusion portion and the seventh protrusion portion are disposed between the seventh signal line and the eighth signal line.

10. The display device of claim 9, further comprising a fourth blue pixel surrounded by the first scanning line and the second scanning line, and the seventh signal line and the eighth signal line, wherein the fourth protrusion portion is disposed between the fourth blue pixel and the seventh protrusion portion.

11. The display device of claim 9, wherein
a height of the fourth protrusion portion is greater than a thickness of the liquid crystal layer located between the seventh protrusion portion and the first substrate.

12. The display device of claim 1, wherein
the first substrate further comprises a ninth signal line and a tenth signal line arranged in order in the first direction and an eighth protrusion portion disposed on the second scanning line,
the second substrate further comprises a ninth protrusion portion,
the eighth protrusion portion comprises a first portion disposed between the ninth signal line and the tenth signal line, a second portion crossing the ninth signal line and extending in the first direction, and a third portion crossing the tenth signal line and extending in the first direction, and
the ninth protrusion portion overlaps the first portion.

13. The display device of claim 1, wherein
the first substrate further comprises ninth to eleventh signal lines arranged in order in the first direction, and an eighth protrusion portion disposed on the second scanning line,
the second substrate further comprises a ninth protrusion portion,
the eighth protrusion portion comprises a first portion overlapping the tenth signal line, a second portion disposed between the ninth signal line and the tenth signal line and extending in the first direction, and a third portion disposed between the tenth signal line and the eleventh signal line and extending in the first direction, and
the ninth protrusion portion overlaps the first portion.

14. The display device of claim 1, wherein
the signal lines include a fifth signal line and a sixth signal line arranged in order in the first direction,
the third protrusion portion, the fourth protrusion portion, the sixth protrusion portion and the seventh protrusion portion are disposed between the fifth signal line and the sixth signal line, and
the third protrusion portion and the seventh protrusion portion are arranged in the first direction, and the fourth protrusion and the sixth protrusion portion are arranged in the first direction.

15. The display device of claim 1, wherein
the signal lines include a fifth signal line, a sixth signal line, a seventh signal line and an eighth signal line arranged in order in the first direction,
the third protrusion portion and the sixth protrusion portion are disposed between the fifth signal line and the sixth signal line,
the fourth protrusion portion and the seventh protrusion portion are disposed between the seventh signal line and the eighth signal line,
the third protrusion portion comprises a first portion extending in the first direction and a second portion extending in the second direction along the fifth signal line,
the sixth protrusion portion and the first portion are arranged in the second direction, and the sixth protrusion portion and the second portion are arranged in the first direction,
the fourth protrusion portion comprises a third portion extending in the first direction and a fourth portion extending in the second direction along the eighth signal line, and
the seventh protrusion portion and the third portion are arranged in the second direction, and the seventh protrusion portion and the fourth portion are arranged in the first direction.

16. A display device comprising:
a first substrate comprising a scanning line extending in a first direction, a signal line extending in a second direction, and first to fourth protrusion portions;
a second substrate comprising fifth to seventh protrusion portions; and
a liquid crystal layer held between the first substrate and the second substrate, wherein
the first to fourth protrusion portions are apart from the second substrate,
the fifth to seventh protrusion portions are apart from the first substrate, and
in planar view, the first protrusion portion and the second protrusion portion are arranged in the first direction, the fifth protrusion portion is disposed between the first protrusion portion and the second protrusion portion, the third protrusion portion and the sixth protrusion portion are arranged in the second direction, the fourth protrusion portion and the seventh protrusion portion are arranged in the second direction, the third protrusion portion and the seventh protrusion portion are arranged in the first direction, and the fourth protrusion portion and the sixth protrusion portion are arranged in the first direction.

17. The display device of claim 16, wherein
the first substrate further comprises a switching element electrically connected to the scanning line and the signal line, a first organic insulating film disposed on the signal line, a pixel electrode electrically connected to the switching element in a through hole of the first organic insulating film, a second organic insulating film disposed on the pixel electrode, and an alignment film disposed on the second organic insulating film, wherein
the first to fourth protrusion portions include the second organic insulating film.

* * * * *